United States Patent
Loskorn

[11] Patent Number: 4,598,360
[45] Date of Patent: Jul. 1, 1986

[54] READ CONTROL OPERATIONS SYSTEM FOR A MULTIPLE LINE ADAPTER ORGANIZATION

[75] Inventor: Richard A. Loskorn, Dana Point, Calif.

[73] Assignee: Burroughs Corporation, Detroit, Mich.

[21] Appl. No.: 580,292

[22] Filed: Feb. 21, 1984

Related U.S. Application Data

[63] Continuation-in-part of Ser. No. 372,106, Apr. 27, 1982, abandoned.

[51] Int. Cl.⁴ .............................................. G06F 1/00
[52] U.S. Cl. ...................................................... 364/200
[58] Field of Search ... 364/200 MS File, 900 MS File

[56] References Cited

U.S. PATENT DOCUMENTS

| | | |
|---|---|---|
| 4,003,032 | 1/1977 | Austin et al. ........................ 364/200 |
| 4,074,352 | 2/1978 | Cook et al. ......................... 364/200 |
| 4,075,691 | 2/1978 | Davis et al. ........................ 364/200 |
| 4,079,452 | 3/1978 | Larson et al. ...................... 364/200 |
| 4,181,941 | 1/1980 | Godsey ............................... 364/200 |
| 4,200,930 | 4/1980 | Rawlings et al. ................... 364/200 |
| 4,264,954 | 4/1981 | Briggs et al. ....................... 364/200 |
| 4,426,679 | 1/1984 | Yu et al. ............................. 364/200 |

Primary Examiner—Raulfe B. Zache
Attorney, Agent, or Firm—Alfred W. Kozak; Nathan Cass; Kevin R. Peterson

[57] ABSTRACT

In a multiple line adapter organization for a data-comm network, each line adapter providing a receiver-transmitter (USART) and timer means which can interrupt and request service from an associated microprocessor. The microprocessor uses Read operators which can then identify the unit requesting service and identify the type of line operations to be used by that particular line adapter.

4 Claims, 12 Drawing Figures

4,598,360

READ CONTROL OPERATIONS SYSTEM FOR A MULTIPLE LINE ADAPTER ORGANIZATION

This application is a continuation-in-part of application Ser. No. 372,106 filed Apr. 27, 1982, now abandoned.

FIELD OF THE INVENTION

This disclosure applies to data communication systems where a multiple group of line adapters work in cooperation with a microprocessor to service a plurality of data-comm lines.

CROSS REFERENCE TO RELATED APPLICATIONS

This disclosure is related to the following U.S. patent applications:

"Bit Oriented Line Adapter System", inventors Richard A. Loskorn, Philip D. Biehl and Robert D. Catiller, and filed Mar. 5, 1982, as Ser. No. 355,134.

"Byte Oriented Line Adapter System", inventors Richard A. Loskorn, Philip D. Biehl and Robert D. Catiller, and filed Mar. 5, 1982, as Ser. No. 355,135.

The following issued patents form a background for understanding the disclosure and are herein included by reference:

U.S. Pat. No. 4,293,909 entitled "Digital System For Data Transfer Using Universal Input-Output Microprocessor".

U.S. Pat. No. 4,291,372 entitled "Microprocessor System With Specialized Instruction Format".

U.S. Pat. No. 4,292,667 entitled "Microprocessor System Facilitating Repetition of Instructions".

U.S. Pat. No. 4,189,769 entitled "Input-Output Subsystem For Digital Data Processing System".

SUMMARY OF THE INVENTION

Each line adapter in a multiple organization of line adapters includes components such as a receiver-transmitter (USART), timing means, and identification means for the type of adapter. Each of these components can interrupt and request service from a microprocessor which has operators for identifying which particular component is requesting service.

A component (such as a USART or a Timer) can request service by activating a flag line (FLAG 2/) which notifies the microprocessor that service is required. The microprocessor then uses a "GET" operator to determine which specific line adapter requires service by scanning to see which line of an I/O bus bit has been "set" (=1). The microprocessor will then designate the desired line adapter, then execute a GET OP (called RCRI). This GET OP is designated as RCRI - Read Component Requestor ID and it determines which component (USART, 1st Program Timer, 2nd Program Timer) on a designated line adapter is requesting service.

Further "Read Control" operations include (a) Read Adapter Type ID (RADTI) which informs the microprocessor of the "type" (bit or byte oriented, private line or switched line, etc.) of line operation to be used by a specific line adapter; and (b) Read Auto Calling Unit Status (RACUST) which will read status signals from a selected Automatic Calling Unit (ACU) onto the I/O bus for transfer to the microprocessor.

DESCRIPTION OF PREFERRED EMBODIMENT

The line adapter read-control operations system of the present disclosure is designed to be used as part of a line support processor (also often called a frame recognition-data link processor) operating as part of a data comm I/O subsystem.

Figure 1:
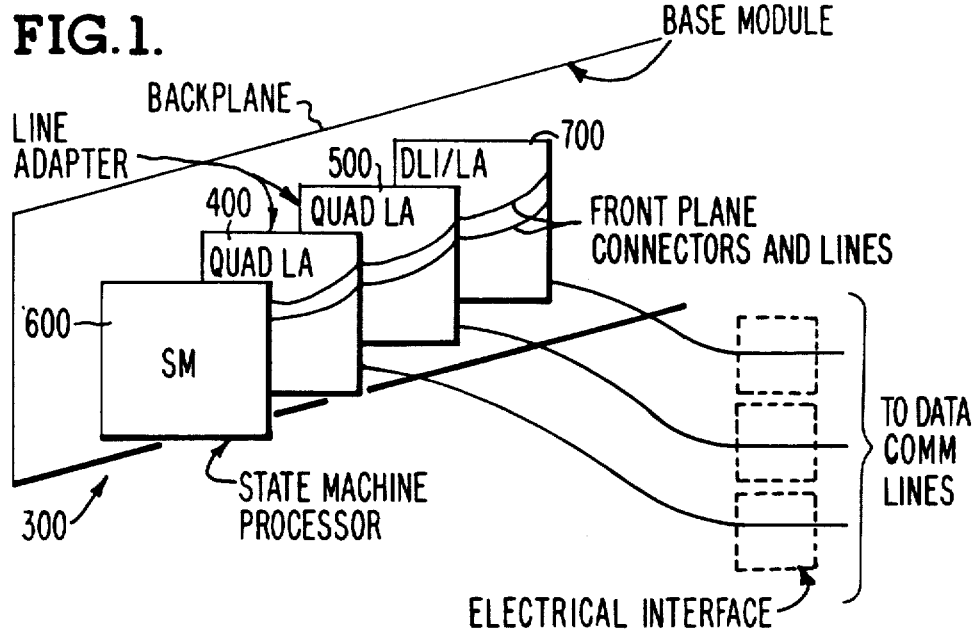
FIG. 1 is a sketch of an I/O system base connection module for connecting slide-in cards which hold a multiple line adapter organization and a microprocessor and data link interface means.

FIG. 1 shows such a data comm I/O subsystem wherein a state machine processor card 600 works in coordination with various types of line adapters. A single line adapter card 700 may be used as well as Quad line adapters such as that shown in cards 400 and 500. These Quad line adapters constitute units of four addressable line adapters, and each line adapter can handle a single data communications line terminal through an electrical interface.

Figure 4:
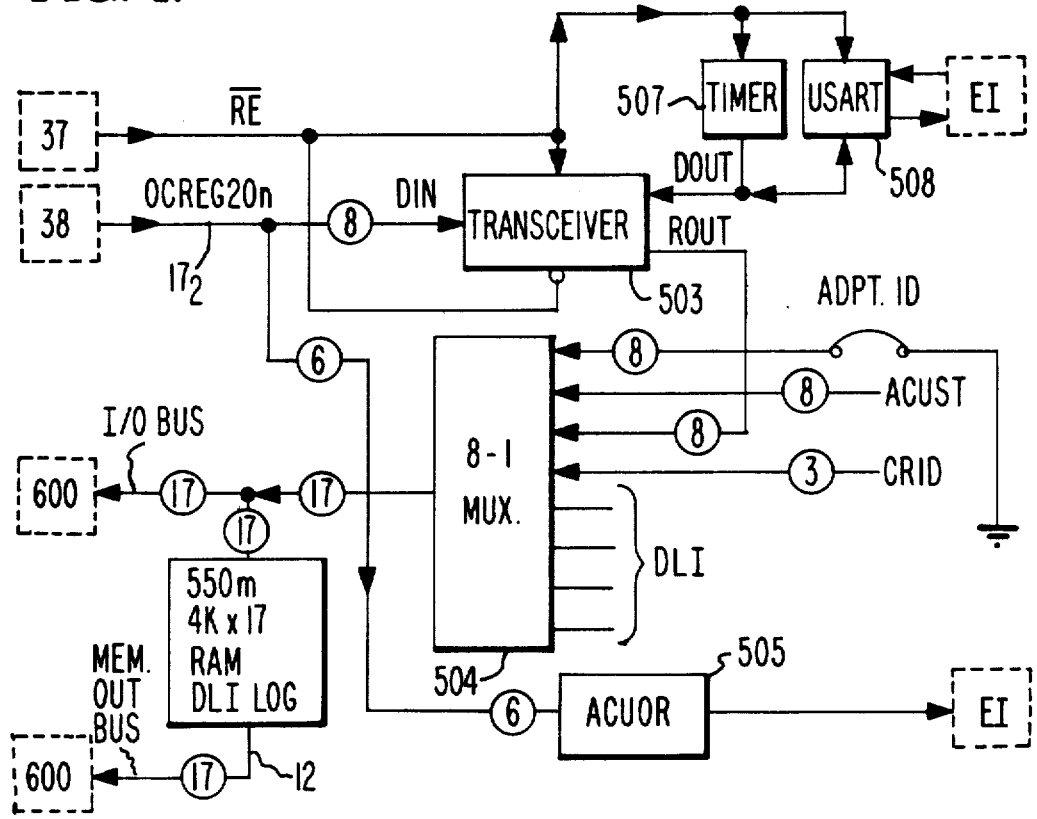
FIG. 4 is a block diagram of a single byte-oriented line adapter which is associated with the data link interface card.

FIG. 4 shows a block diagram of a "Single" byte oriented line adapter system. A remote data set or data terminal may be connected to input/output circuit means which includes timer 507 and USART 508. This input output circuit connects to a transceiver bus-controller 503 which can route the data to a multiplexor 504 for conveyance along I/O bus 10 to the state machine processor 600 or into a RAM buffer $550_m$. Data in the state machine processor can be routed from the state machine's output control register (38, FIG. 3) along bus $17_2$ into the transceiver bus controller 503 for transmission to the input-output circuit means. The multiplexor 504 receives control signals from the data link interface unit 700 of FIG. 1 in addition to other control signals which identify units within the line adapter system. Also provided is an automatic calling unit output register 505 which can receive signals useful for dialing remote terminals on telephone lines.

Figure 2:
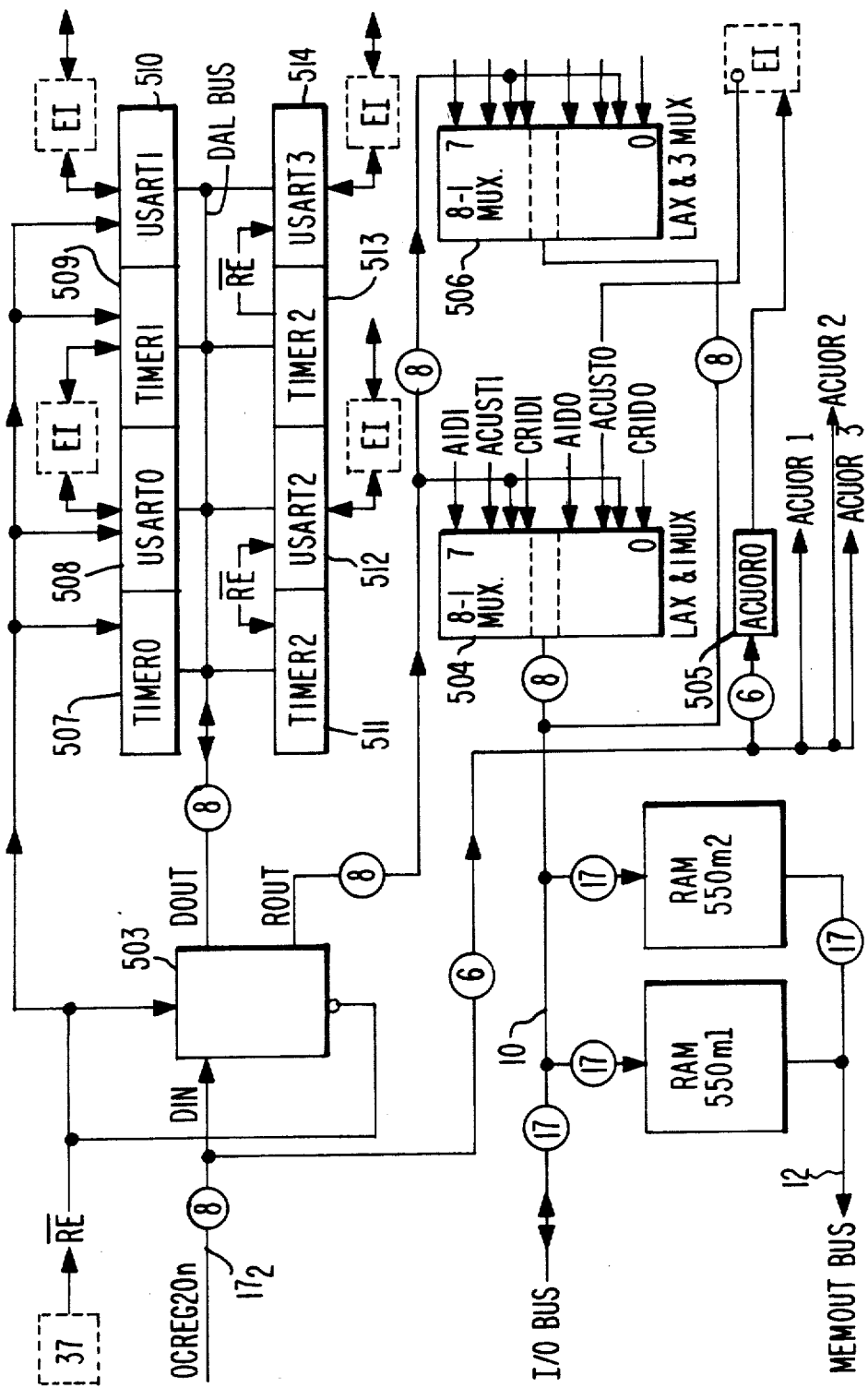
FIG. 2 is a block diagram of a multiple line adapter organization situated on a slide-in card.

FIG. 2 is a block diagram of a "Quad" Line Adapter used for byte oriented protocol operations. The input output circuit means which connect to remote terminals is composed of four basic units such as 507, 508 (timer 0 and USART 0). Likewise, input output service to a remote terminal is provided by timer 509 and USART 1 designated 510. Likewise, units 511, 512 constitute an operating unit for another remote terminal as do units 513 and 514 for yet another remote terminal.

As discussed under FIG. 4, the Line Adapter uses a transceiver bus controller 503 and a set (FIG. 2) of multiplexors 504 and 506. It should be noted that the multiplexors such as 504 and 506 are in essence dual operating multiplexor sets in that they receive control signals from two different input-output units.

Corresponding to the Automatic Calling Unit Output Register of FIG. 4, the Quad Line Adapter of FIG. 2 uses four such ACU output registers. Also in the Quad Line Adapter there is provided an extra set of RAM buffer memories designated $550_{m1}$ and $550_{m2}$.

Figure 3:
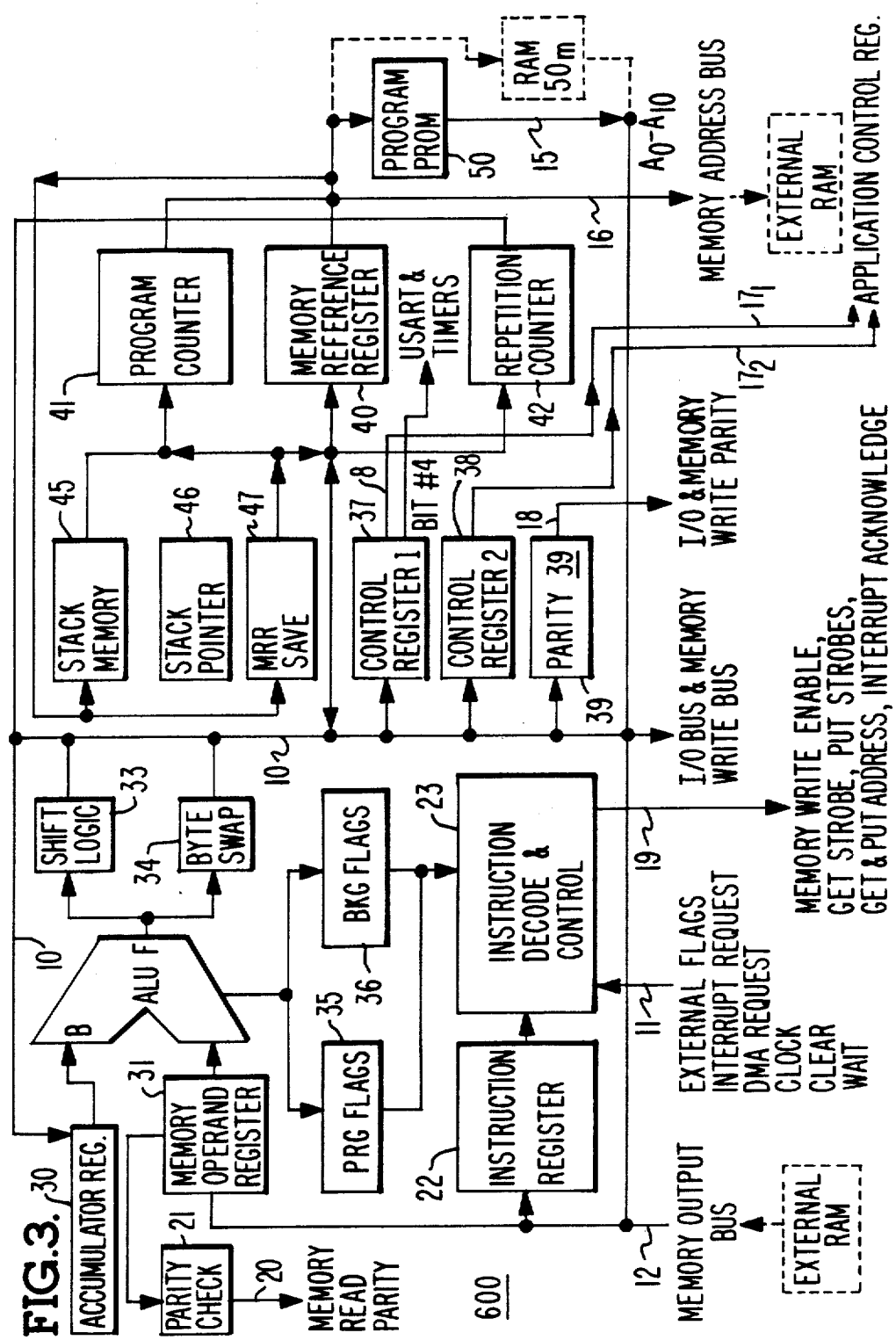
FIG. 3 is a block diagram of the state machine microprocessor which controls operation of any designated line adapter.

FIG. 3 is a block diagram of the State Machine Microprocessor which is used to control the single line adapter or multiple configurations of line adapters. The State Machine Processor (sometimes designated as UIO State Machine) resides on a circuit board of chips which can be inserted as a slide-in card into the base module (FIG. 1) where it connects to the backplane. The State Machine connects to the application dependent logic through the frontplane connectors as seen in FIG. 1.

A detailed description of the elements and use of the UIO State Machine has been the subject of several prior patents which are included herein by reference. These patents are:

U.S. Pat. No. 4,293,909 entitled "Digital System For Data Transfer Using Universal Input-Output Microprocessor", inventors Robert D. Catiller and Brian K. Forbes.

U.S. Pat. No. 4,291,372 entitled "Microprocessor System With Specialized Instruction Format", inventors Brian K. Forbes and Robert D. Catiller.

U.S. Pat. No. 4,292,667 entitled "Microprocessor System Facilitating Repetition of Instructions", inventors Robert D. Catiller and Brian K. Forbes.

The use of a host computer working in conjunction with an I/O subsystem which uses peculiar commands called I/O descriptors, data link descriptors, and result descriptors is shown in U.S. Pat. No. 4,189,769, Feb. 19, 1980, to Darwen J. Cook and Donald A. Millers, II, and entitled "Input-Output Subsystem For Digital Data Processing System" and this patent is also included herein by reference.

Figure 5:
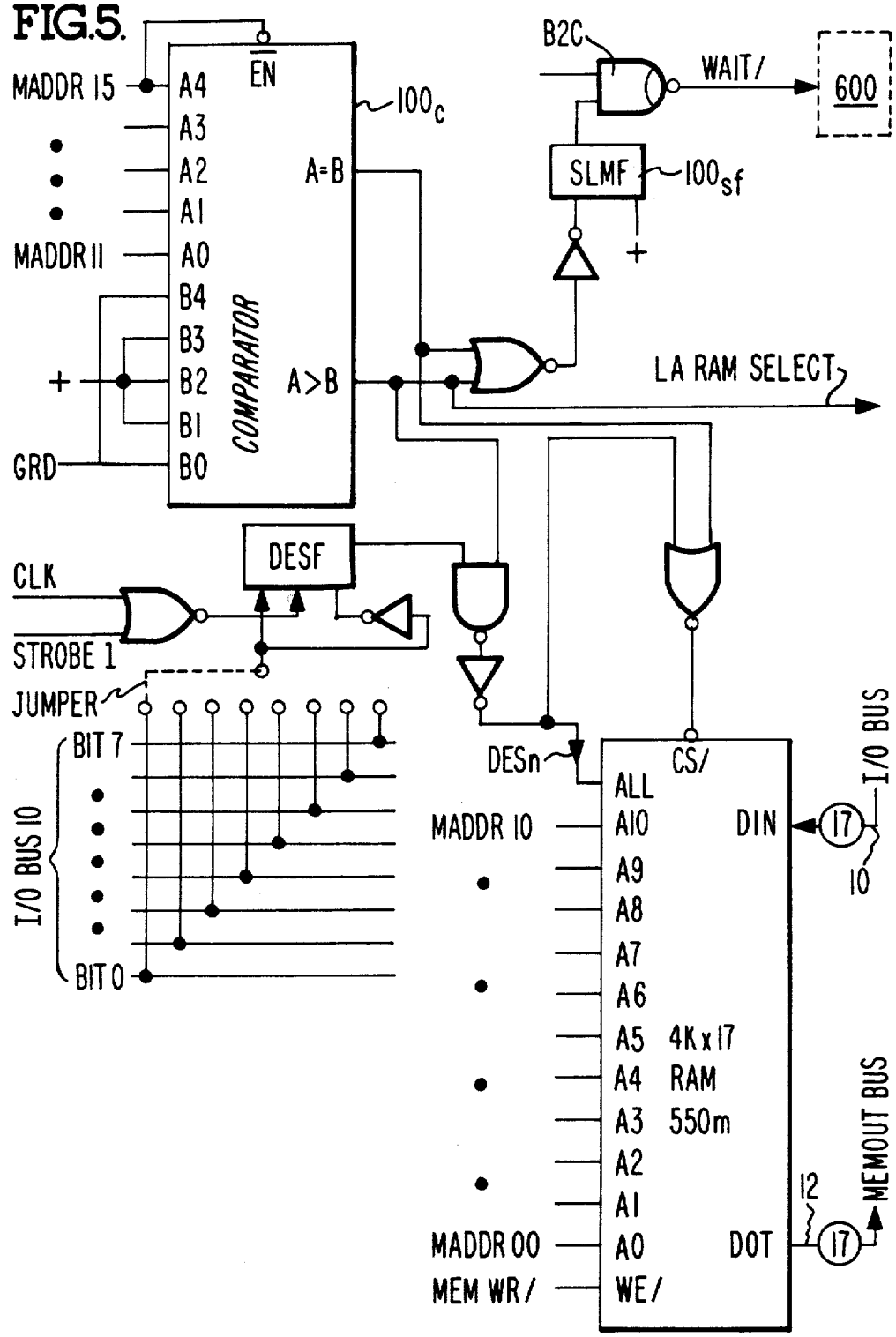
FIG. 5 is a drawing of logic circuitry used to select a given line adapter and a specific component such as a particular RAM of the selected line adapter.

FIG. 5 is a diagram of certain logic on the DLI/LA (Data Link Interface/Line Adapter) card 700 which is used to select or "designate" the RAM buffer memory of the single Line Adapter card or a selected memory of a specific one of the four line adapter memories on the Quad line adapter card. Shown as RAM storage means $550_m$ in FIG. 5 is the particular memory used for the single Line Adapter. However, in the "multiple" Line Adapter situation, each Line Adapter has a similar selection system for selecting the particular memory associated with that Line Adapter.

In FIG. 5, address lines from the State Machine Processor (MADDRnn) connect to a comparator $100_c$ and also to the RAM buffer $550_m$. A chip select signal CS/ is activated to the buffer memory $550_m$ by means of logic signals from the comparator $100_c$ and the Designate Flip-Flop (DESF). A unique jumper bit provides input to the Designate Flip-Flop from the I/O bus 10 in order to particularly identify any given selected buffer memory in the system. The particular bit line of the I/O bus 10, which is to be chosen, is set by the State Machine Microprocessor 600 of FIG. 3.

"BYTE ORIENTED" LINE ADAPTER

A functional section of the Line Support Processor (also called the Frame Recognition-Data Link Processor and/or Line Support Processor-DLP) is the Line Adapter called the "Byte Oriented Line Adapter". This is sometimes also called a "Character Oriented" Line Adapter.

The data comm Line Adapter is basically a device which interfaces on one end to a data communication line "electrical interface", and on the other end interfaces to a processor which has been designated as the UIO State Machine 600 (UIOSM). The primary function of the Line Adapter is to serialize "bit" information to/from "byte" information, to provide timing, to generate service requests, to supply a RAM memory, to provide automatic calling interfacing and to provide connection to level changers which will match the data communication lines. The Byte-Oriented Line Adapter is also built in two basic configurations designated as (i) Quad Line Adapter and (ii) the Single Line Adapter. The Single Line Adapter is part of the Line Support Processor and the Single Line Adapter shares the same board with the Data Link Interface (DLI) circuitry. The Line Adapter is required regardless of the quantity of lines controlled by the Line Support Processor. The Quad Line Adapter contains essentially four (4) Line Adapters on one board. These boards are typical 10 inch by 13 inch boards which plug into the backplane of the Base Connection Module, FIG. 1. Also a smaller version of the Line Adapter may be configured as a "Dual" Line Adapter which consists of two Line Adapters on one board rather than four Line Adapters.

As seen in FIG. 1 each of the Line Adapter cards 400,500 connect both to the State Machine Processor 600 and to the DLI/LA 700 (Data Link Interface-Single Line Adapter).

As seen in FIGS. 2 and 4, connection to the data communications line is through an electrical interface (EI) which connects to the Line Adapter. There are various types of electrical interface boards which exist and which may be mounted in different combinations on the Quad Line Adapters. Thus, depending on the electrical characteristics of the data comm line, the only change required is that of the electrical interface, while the Line Adapter remains as is.

From one to eight Line Adapters may variously be addressed by the State Machine Processor 600; thus, each Line Adapter is jumpered uniquely in order to identify its address. The Line Adapter must be "designated" for the State Machine Processor to communicate with it. Several addressable components are contained on a Line Adapter which the State Machine Processor may communicate with, in the form of Write/Read data or "Status" or "Control" signals.

The addressable components of the Byte Oriented Line Adapter are:
(i) USART (508, 510, 512, 514, FIG. 2)
(ii) Timer (507, 509, 511, 513., FIG. 2)

(iii) Auto Call Output Registers
(iv) Auto Call Status for each ACU
(v) Component Requestors (units in USART and/or Timers)
(vi) Memory (RAM)

The USART (Universal Synchronous/Asynchronous Receiver/Transmitter) accepts data "bytes" from the State Machine Processor 600 and converts them into serial "bits" for transmission; it also receives serial bit data and converts this to parallel data bytes. The USART device is initialized by "writing" into its two internal control registers which specify the manner in which it operates.

A typical USART preferred for this purpose is manufactured by Western Digital Corporation, 3128 Redhill Avenue, Newport Beach, Calif. 92663, and is designated as UC1671 and described in a Technical Manual dated August 1978 as UC1671 Asynchronous/Synchronous Receiver/Transmitter.

Various bits of the internal control registers of this USART unit specify such things as: synchronous/asynchronous mode; bits per character; parity; transparent mode; Echo mode. The Timer used on the Byte Oriented Line Adapter serves two basic functions: (i) as program timers and (ii) as baud rate generators for asynchronous operation. Three independent internal timers are contained in each chip, two of which are used by the software for timing purposes relative to the line operations for "transmit" and for "receive" operation. The third timer is used to generate a square wave clock which is used by the USART for asynchronous operation. Each timer is initialized independently, which indicates the "mode" in which it is to operate. The two program timers are capable of activating a Flag signal to the State Machine Processor 600 when a pre-determined timing value has been reached.

The Auto Call Output Register (ACUOR 505) is a register which is loaded by the State Machine Processor with "dial digit" and control information. The output of this register drives level-changer chips which convert the logic signals to EIA RS-232 voltages. These signals drive an automatic calling unit (ACU) such as a Bell 801, which provides dial-out capabilities.

Auto Call Status (ACUST 0, 1, 2, 3 of FIG. 2) is a means of providing the condition or state of input lines from the automatic calling unit (ACU) to the State Machine Processor 600. Lines from the ACU are received by level-changer chips which convert the EIA voltages to TTL logic levels. These logic levels may be read by the State Machine Processor to determine the present status.

The Component Requestors from a Line Adapter are as follows: (i) USART; (ii) Program Timer 1; (iii) Program Timer 2.

These three components are capable of generating "service requests" independently of each other at unique times relative to its initialization. The "service requests" activate a flag signal to the State Machine Processor which indicates that Line Adapters require servicing. After the State Machine determines which Line Adapters are requesting service, it must then determine which "component" on a particular Line Adapter is requesting service.

Memory on the Line Adapter consists of 2,048×17-bit words of RAM for each line. Therefore, each Quad Line Adapter card actually contains 8,192×17-bit words of RAM. The Single Line Adapter card (FIG. 4) contains 4,096 words of RAM $550_m$, one half for the data comm line and the remainder for DLI700, FIG. 1. The RAM is used by the software for transmit/receive message buffering, for tables and for statements associated with the line operation.

BYTE ORIENTED LINE ADAPTER - OPERATION

Designate: When the State Machine Processor 600 executes code relative to an addressable component on a Line Adapter, (LA), the LA must be "designated". Each Line Adapter contains a Flip-Flop, whose input is jumpered to a specific bit of the I/O bus FIG. 5. In order to "designate" a Line Adapter, the State Machine Processor must execute a PUT OP with Strobe No. 1 and the corresponding bit of the I/O bus must be equal to 1. Executing the same OP with the I/O bus bit equal to 0, will reset the Designate Flip-Flop shown typically as "DESF" on FIG. 5.

Flag Operation: The various components of a Line Adapter are capable of producing "service requests". These "service requests" are basically ORed together in order to drive a common FLAG line for all Line Adapters. A signal line, FLAG 2/, (FIG. 6), when being low active, notifies the State Machine Processor that some Line Adapters are requesting service. The State Machine Processor can determine which Line Adapters are requesting service by executing a GET OP with the variant field V-FLD (4:5) equal to 00001. The Line Adapter does not need to be "designated" for execution of this OP.

"Register address" (REGADRn) signals in the Line Adapters are the five V-FLD signals from the State Machine Processor.

Figure 6:
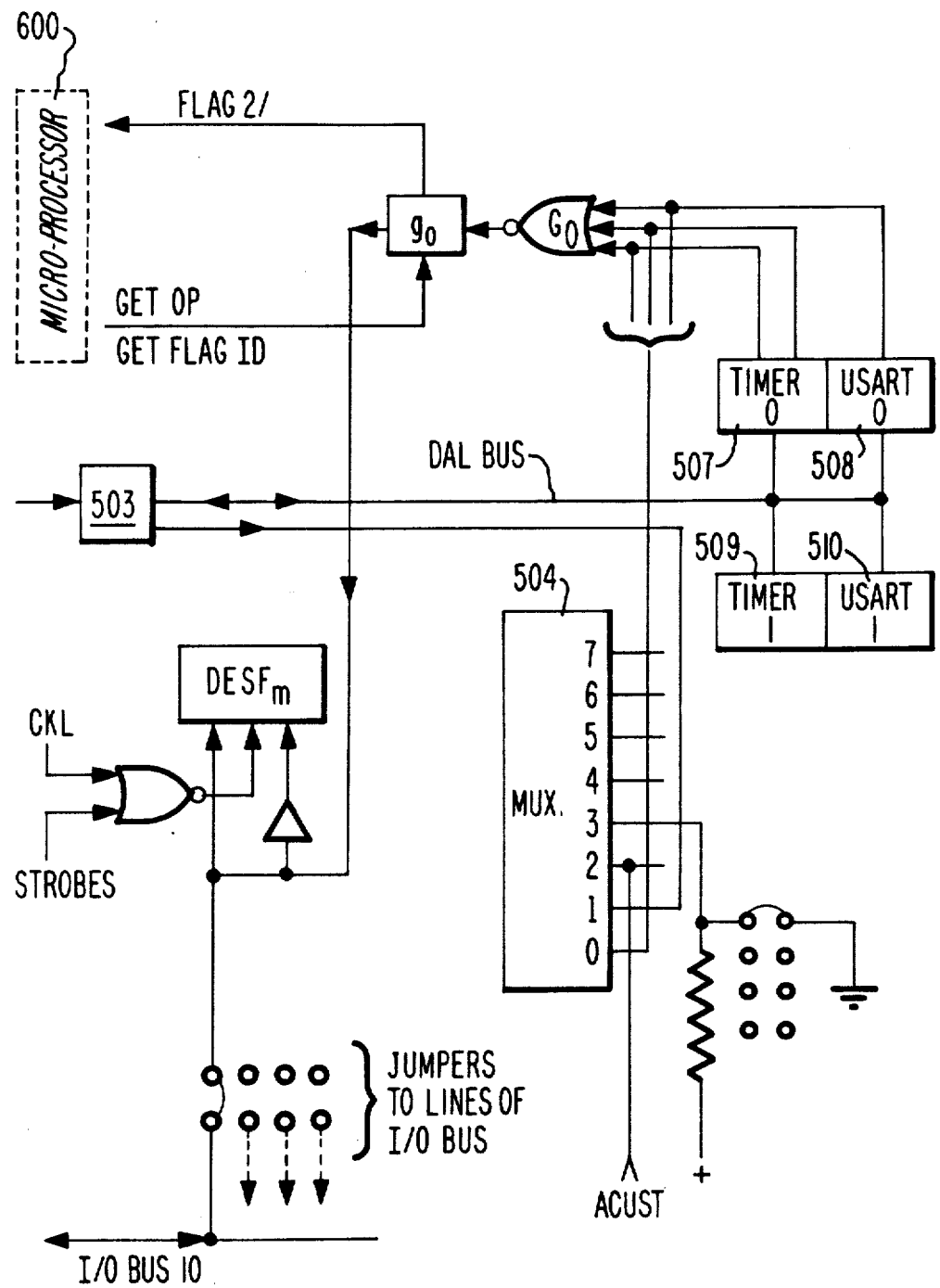
FIG. 6 is a drawing showing how a line adapter and its components request service from the microprocessor and how the microprocessor identifies the component requesting service and identifies the type of line adapter involved.

Flag operation, with reference to FIG. 6, is accomplished by the FLAG 2/ line which when low active notifies the State Machine Processor that a Line Adapter is requesting service. For example in FIG. 6, if Line Adapter 0 requests service then NOR Gate $G_0$ is activated to provide a signal (low) on the FLAG 2/ line.

Upon receiving this signal the State Machine Processor will initiate a GET OP on the GET FLAG ID line. This will send the output signal of Gate $G_0$ to a particular line of I/O bus (which is dedicated to a particular one of the Line Adapters) which, when read by the State Machine will identify the particular Line Adapter involved, in this case, the Line Adapter 0.

Similarly each Line Adapter as 1, 2, 3, etc. will have a Gate $G_1$, $G_2$ or $G_3$ to activate the FLAG 2/ line and cause the State Machine to "read" the particular "jumper" connection to the line on the I/O bus associated with that Line Adapter.

Data Bus Structures: With the exception of the RAM (FIG. 5), memory $550_{m1}$, $_{m2}$, all data sent to addressable components on the Line Adapter originate from the "Second Output Control Register 38 (FIG. 3) in the State Machine Processor. With the exception of RAM, all data "read" by the State Machine Processor from addressable components on the Line Adapter will go to the State Machine Processor via the I/O bus 10.

With reference to FIG. 4 (DLI/LA data bus structure), the Single Line Adapter data bus structure is shown.

As seen in FIG. 4, the Second Output Control Register 38 (FIG. 3) lines $17_2$ OCREG 20n) connect directly to the inputs of the Auto Call Unit Output Register 505 (ACUOR); and they also connect directly to the Transceiver Bus Controller chip 503 which provides bidirectional bus drivers.

The Auto Call Unit Output Register 505 is a six bit "D" type flip-flop register (DR6n). When the clock input is enabled, data from the Second Output Register 38 will be strobed into ACUOR 505.

Data sent to both the Timer 507 and to the USART 508, FIG. 4, originate from the Second Output Register 38 in the State Machine Processor (FIG. 3) and is sent through the Transceiver bus controller 503; then is sent to the addressed component. The data lines for the Timer component are HI active and for the USART component they are LO active. Being as both components share the same data bus, data to one of the components must be inverted. The Timer 507 is used to receive the "inverted" data, that is, 1=0 and 0=1, while the USART 508 receives the conventional format. Thus, a "one" bit from the Second Output Register 38 in the State Machine Processor (FIG. 3) will appear as a "one" bit to the USART (active low) and as a "zero" bit to the Timer. The Transceiver bus controller 503, although being a three-state device, is not used in its third or high impedance state. It is used for driving either DIN (data in) to DOUT (data out) or DOUT to ROUT depending on the state of the RE signal (Read Enable) which originates from bit 4 of the First Output Control Register 37 in the State Machine Processor. When bit 4 of Register 37 is ON, the signal RE is positive and "enables" the DIN to DOUT direction through the Transceiver bus controller 503.

Reading of information (except RAM read) from a Line Adapter is performed by decoded GET OPs, and the read information is available on the least significant 8 bits of the I/O bus 10. The 8-1 multiplexor 504 is the source of the read information.

On the "Single" Line Adapter (FIG. 4) four of the eight inputs to MUX 504 are used by the Line Adapter and the remainder are used by the Data Link Interface (DLI). The multiplexors (MUX's) are chip selected (low level) during a GET OP when the V-FLD (3:2) is equal to "11" and either V-FLD (4:1) equals 0 (DLI GET) or the Designate Flip-Flop (DESF) is ON (LA GET).

On the "Quad" Line Adapter cards (FIG. 2) there are 16 multiplexors, each having an eight-one ratio. There are 8 multiplexors for each pair of Line Adapters.

As seen in FIG. 4, the eight input lines to MUX 504 are divided in half such that four lines connect to the DLI (Data Link Interface), and four lines connect to the Line Adapter. Similarly in FIG. 2, in the Ouad Line Adapter, the eight input lines of each group of eight multiplexors is divided in half, similar to the Single Line Adapter, thereby making four groups. Any group of four input lines is selected by its "Designate Flip Flop" (DESF, FIG. 5) being ON. The selection of any one of four lines of any such group is performed by the two least significant bits of the V-FLD of a GET OP.

Data to be "written into" RAM memory in a Line Adapter (FIGS. 2, 5) is sent via the I/O bus in 16 bits plus parity format. The data "read from" RAM memory in a Line Adapter is placed on the MEMOUT bus 12 with 16 bits plus parity.

Component Addressing: As seen in FIG. 4, the outputs of components to be "read" are routed to the inputs of the 8-1 multiplexor 504 which then drive the I/O bus 10. There are five components on a Line Adapter which may be "read" by the State Machine Processor, these are:

Component Requestor ID (CRID)
USART (508)
Timer (507)
Automatic Calling Unit Status (ACUST)
Adapter Type ID (ADPT.ID)

Although these five components on a Line Adapter may be read, the USART 508 and the Timer 507 share the same input line (ROUT) to the multiplexors. Selection of one of the four inputs in either group (of inputs to the 8-1 multiplexors) is performed by the two least significant bits of the V-FLD of the GET OP. V-FLD (3:4) equals 11XX and selection of one of the four inputs is determined as shown in Table Y-1.

TABLE Y-1

| VI(x) | VO(x) | Component Addressed |
|---|---|---|
| 0 | 0 | Component Requestor ID |
| 0 | 1 | USART/Times |
| 1 | 0 | ACU Status |
| 1 | 1 | Adapter Type ID (Identification) |

In FIG. 4 the Single Line Adapter multiplexor 504 allows three components on a Line Adapter to be written into (not including RAM). These are: Automatic Calling Unit Output Register 505 (ACUOR), the USART 508 and the Timer 507. The addressing of these three components occurs in two distinct fashions: decode of the V-FLD of PUT Ops and the decode of bits from the First Output Control Register 37 in the State Machine Processor (FIG. 3).

The ACUOR 505 is addressed when a one-of-eight decoder chip decodes the PUT OP V-FLD (4:5) equal 01111 and the Strobe No. 2 is sent from the State Machine Processor. This decoding is performed only on the Single Line Adapter card and is sent to other Line Adapter cards via the frontplane connector. This decoded signal is received by a three input NOR gate (not shown) in each Line Adapter (whose other inputs are Clock and Designate FF). The output of this gate drives the clock input of the six bit ACU output register.

Data from the Second Output Control Register 38 (FIG. 3) will then be strobed into the ACUOR 505.

Addressing a USART or Timer on a designated Line Adapter is the same as "chip selecting" the component. This is accomplished with bits 0 and 1 of the First Output Control Register 37 in the State Machine Processor along with the Designate Flip-Flop in a Line Adapter.

Each Line Adapter will "AND" its Designate FF with bits 0 and 1 in order to provide a UCS (USART Chip Select) or a TCS (Timer Chip Select) for its USART or Timer.

The use of bits 0 and 1 in the First Output Control Register 37 is as follows:

TABLE Y-2

| Register Bit and Value | Signal Designation |
|---|---|
| Bit 0 = 1 | USARTCS = USART Chip Select-UCS |
| Bit 1 = 1 | TMRCS = Timer Chip Select-TCS |

The remaining bits of Register 37 are used for control signals, primarily for the USART and Timer.

Random Access Memory (550m, FIG. 5): Each data comm line has 2,048 words of RAM available for its use. A word is equal to 16 data bits plus one parity bit. In FIG. 5 the RAM chip $550_m$ is a 4,096 × 1 bit static RAM with a Read Access time of 180 nanoseconds and is arranged with 17 chips making 4,096 words. On the DLI/LA card, 2,048 words are for the "Single" Line Adapter and 2,048 words are for the Data Link Interface. The "Quad" Line Adapter card (FIG. 2) provides 34 memory chips or 8,192 words of which 2,048 words are available for each line.

The data comm Line Adapter memory (for any line) is "pointed at" by the memory address lines, MADDR (15:5equal 01110. This can be seen in FIG. 5 which shows the Data Link Interface/Line Adapter RAM $550_m$. A five bit Comparator $100_c$ on the DLI/LA card compares (for an "equal" condition) for (i) DLI memory selection; or for a "greater than" condition,- (MADDRnn 01110) which provides for (ii) Line Adapter RAM selection in a particular line adapter. The signal "LARAMSEL" (Line Adapter RAM Select) will go to all Line Adapter cards via the frontplane cable to select the "designated" Line Adapter RAM memory. If memory address lines MADDR (15:5) equal 0111x (DLI or LA Select) then a slow memory flip-flop (SLMF) $100_{sf}$ will be set equal to 1. The Flip-Flop $100_{sf}$ output (FIG. 5) drives an open collector NAND gate B2C whose output connects to the WAIT/ frontplane signal line to the State Machine Processor 600. This signal (WAIT/), when low, will force the State Machine Processor to "wait" until the signal goes "high". Using a RAM chip whose Read Access time is 180 nanoseconds requires the State Machine Processor to wait for one clock time, thereby when the DLI memory ($550_m$, FIG. 5) or any Line Adapter memory is selected, the SLMF (slow memory flip-flop) will be "on" for one clock and then toggle off.

Selection of the RAM memory $550_m$ on the DLI/LA card is done via MADDR (15:5) equal to 01110 or else if ON then a particular RAM is selected. This logic controls the chip-select input on the RAM chips. This selection of RAM for DLI or for Line Adapter memory is handled by controlling the "A-11" (FIG. 5) address pin, as for example, on the RAM $550_m$ chip. FIG. 5 illustrates the typical setup for each Line Adapter RAM in the system having its own individual "All" input from its own individual designate flip-flop, DESF. If MADDR (15:5) is equal to 01111 and the Line Adapter Designate Flip-Flop (DESF) is ON, the RAM is chip selected and the A-11 address input is TRUE.

The "Quad" Line Adapter card (FIG. 2) contains two groups of memory chips ($550_{m1}$, $550_{m2}$) wherein Data-Comm (D.C.) lines 0 and 1 on the card share the same group of RAM chips and Data-Comm lines 2 and 3 share the other group of RAM chips. The signal LARAMSEL (Line Adapter RAM Select, FIG. 5) goes to all Line Adapters and is then essentially ANDED with appropriate Designate conditions to allow the desired RAM group to be chip selected. A "division" of RAM for the first or second data-comm line on a Quad Line Adapter is handled by controlling the "A-11" address pin (FIG. 5) on the RAM chip (signal DESn where n=1) and for the third and fourth line, the "A-11" pin on the second group of RAM chips is controlled by DESn (FIG. 5) where n=3.

A "Dual" Line Adapter will only contain one group of memory chips (17) and will operate the same as line 0 and line 1 on the Quad Line Adapter. Data to be written into RAM must be placed on the I/O bus 10 by the State Machine Processor and "read data" will be sent to the State Machine Processor on the MEMOUTnn bus 12 (nn equals 00→16).

Clear: There are two methods of clearing used to clear the Line Adapters; these are "Power Up" Clear and "Designate" Clear.

The Power Up Clear is a signal which occurs during the power-up sequence for the cabinet housing the Line Adapters. The signal comes from the backplane of the Base Module cabinet and is active Low.

The Designate Clear is a function controlled by the State Machine Processor, and only the Line Adapters which are designated are the ones that get cleared. The Clear signal originates from bit 7 of the First Output Control Register 37 of the State Machine Processor (FIG. 3). The "Power-up" Clear operates to clear three components on the Line Adapter. These are: the Designate Flip-Flop; the Auto Call Output Register; and the USART.

The "Designate" Clear signal clears two components on the Line Adapter. These are: Auto Call Unit Output Register (ACUOR); and the USART.

USART Orqanization and Operation: The USART is a MOS/LSI device housed in a 40-pin Dual-in-line package and is TTL compatible on all inputs and outputs. The USART performs the functions of interfacing a "serial" data communications channel to a parallel digital system and is capable of full duplex communications with synchronous or asynchronous systems.

One preferred embodiment of the USART is that manufactured by Western Digital Corporation, 3128 Redhill Avenue, Newport Beach, Calif. 92663 and is designated as Model UC1671 Asynchronous/Synchronous Receiver/Transmitter and described in their Technical Data Publication of August 1978 which includes a block diagram showing the various registers, controls and components which are briefly described herein below.

(i) Receiver Register (RR): this is an eight bit shift register which inputs the received data at a clock rate determined by an internal control register. The incoming data is assembled to the selected character in length and then transferred to the Receiver Holding Register with logic zeroes filling out any unused high-order bit positions. At this time the INTR (Interrupt) output is made active for informing the State Machine 600 (FIG. 3) that the Receiver Holding Register contains valid data.

(ii) Receiver Holding Register (RHR): this is an 8-bit parallel buffer register which presents assembled receiver characters to the DAL (Data Access Line) bus lines (FIG. 2) when requested through a Read operation.

(iii) Comparator: the 8-bit comparator is used in the Synchronous Mode to compare the assembled contents of the Receiver Register and the SYN register or the DLE register. A "match" between the registers sets up the stripping of the received character (when programmed) by preventing the data from being loaded into the Receiver Holding Register. A bit in an internal Status Register is set when stripping is performed. The comparator output also enables character synchronization of the Receiver on two successive matches with the SYN register.

(iv) SYN Register: this is an 8-bit register which is loaded from the DAL (Data Access Line) lines (FIG. 2) by a Write operation and it holds the synchronization code used to establish receiver character synchronization. It serves as a fill character when no new data is available in the Transmitter Holding Register during transmission. This register cannot be read onto the DAL lines. It must be loaded with logic zeroes in all unused high-order bits.

(v) DLE Register: this is an eight bit register which is loaded from the DAL lines by a Write operation and holds the "DLE" (Delimiter) character used in the Transparent Mode of operation, in which an idle transmit period is filled with the combination DLE/SYN pair of characters rather than a single SYN character. In addition, the USART may be programmed to force a single DLE character prior to any data character transmission while in the "transmitter transparent mode".

(vi) Transmitter Holding Register (THR): this is an eight-bit parallel buffer register which holds parallel transmitted data transferred from the DAL lines by a Write operation. This data is transferred to the Transmitter Register (TR) when the transmitter section is enabled and the Transmitter Register is ready to send new data. During this transfer, the signal interrupt (INTR) is made active for informing the Line Support Processor that the Transmitter Holding Register is empty.

(vii) Transmitter Register: this is an eight-bit shift register which is loaded from the THR (Transmitter Holding Register), the SYN register, or the DLE register. The purpose of this register is to serialize data and present it to the transmitted Data Output lines.

(viii) Control Register: are two eight-bit control register (CR1, CR2) in the USART which hold device programming signals such as: mode selection, clock selection, interface signal control, and data format. Each of the control registers can be loaded from the data access lines (DAL) by a Write operation, or else read into the DAL lines by a Read operation. By designation, "CR 16" would represent bit 6 of control register 1; and "CR 23" would represent bit 3 of control register 2.

Operation of USART of Byte Oriented Line Adapter

ASYNCHRONOUS MODE: The framing of asynchronous characters is provided by a Start Bit (logic low) at the beginning of a character, and by one or more Stop Bits (logic high) at the "end" of a character. Reception of a character is initiated on recognition of the first Start Bit by a positive transition of the receiver clock, right after a proceeding Stop Bit. The Start and Stop bits are "stripped off" while assembling the serial bit input into a parallel character.

The character assembly is completed by the reception of the Stop Bit after the reception of the last character bit. If this bit is a logic "high?, the character is determined to have "correct" framing and the USART is prepared to receive the next character. If the Stop Bit is logic "low", the Framing Error Status flag is set and the Receiver assumes this bit to be the Start Bit of the next character. Character assembly continues from this point if the input is still a logic "low" when sampled at the theoretical center of the assumed Start Bit. As long as the Receiver input is "spacing" (i.e. receiving a space rather than a Mark), then all zero characters are assembled, and error flags and data received interrupts are generated so that line breaks can be determined. After a character of all zeroes is assembled along with a zero in the Stop Bit location, the first-received logic "high" is determined as a Stop Bit and this resets the receiver circuit to a "Ready" state for assembly of the next character.

In the Asynchronous Mode the character transmission occurs when information contained in the THR (Transmitter Holding Register) is transferred to the TR (Transmitter Register). Transmission is initiated by the insertion of a Start Bit, followed by the serial output of the character (least significant bit first) with parity, if enabled, following the most significant bit; then there is the insertion of the 1-, 1.5-, or 2-bit length Stop condition. If the THR (Transmitter Holding Register) is full, the next character transmission starts after the transmission of the Stop Bit of the present character in the TR (transmitter register). Otherwise, the "Mark" (logic high) condition is continually transmitted until the THR (Transmitter Holding Register) is loaded.

SYNCHRONOUS MODE: The synchronization of messages is carried out by a special Synchronization Character Code (SYN) transmitted at the beginning of a block of characters. The Receiver, when enabled, searches for two contiguous characters matching the bit pattern contained in the SYN register. During the time that the Receiver is searching, data is not transferred to the THR (Transmitter Holding Register) and status bits are not updated; and the Receiver interrupt is not activated. After the detection of the first SYN character, the Receiver assembles subsequent bits into characters whose length is determined by the contents of the USART internal control register. If, after the first SYN character detection, a second SYN character is present, the Receiver enters the Synchronization Mode until the Receiver Enable Bit is turned "off". If a second successive SYN character is not found, then the Receiver reverts back to the Search Mode.

In the Synchronous Mode, a continuous stream of characters are transmitted once the Transmitter is enabled. If the THR (Transmitter Holding Register) is not loaded at the time the Transmitter Register has completed the transmission of a character, this "idle" time will be filled by a transmission of a character contained in the SYN register in the Non-Transparent Mode, or filled by the characters contained in the DLE and the SYN registers respectively (while in the Transparent Mode of operation).

RECEIVER OPERATION: The Receiver data input is clocked into the Receiver Register by a 1X Receiver clock from a modem Data Set, or by a local 32X bit rate clock (asynchronous) selected from one of four input pins. When using the 1Receiver Clock, the Receiver data is sampled on the positive transition of the clock in the Synchronous Modes. When using a 32X clock in the Asynchronous Mode, the Receive Sampling Clock is phased to the "Mark-To-Space" transition of the Received Data Start Bit and defines (through clock counts) the center of each received Data Bit at the positive transition 16 clock periods later. When the complete character has been shifted into the Receiver Register, it is transferred to the RHR (Receiver Holding Register); the unused, higher number bits are filled with zeros. At this time the "Receiver Status bits" (Framing Error/Sync Detect, Parity Error/DLE Detect, Overrun Error, and Data Received) are updated in the Status Register and the Data Received "interrupt" is activated. Parity Error is set if encountered while the Receiver Parity Check is "enabled" in the internal control register. Overrun Error is set if the Data Received Status Bit is not cleared through a Read Operation by an external device when a new character is ready to be transferred to the RHR (Received Holding Register). This error flag indicates that a character has been lost, that is, new data is lost, and the old data and its status flags are saved.

The characters assembled in the Receiver Register that match the contents of the SYN or the DLE register are not loaded into the RHR (Receiver Holding Register), and the DR (Data Received) interrupt is not generated if bit 3 of USART control register 2 (CR23=SYN Strip) or Bit 4 of USART control register 1 (CR14=DLE Strip) are set respectively. The SYN-DET and the DLE-DET status bits are set with the next non-SYN or DLE character. When both control register bits CR23 and CR14 are set (Transparent Mode), the DLE-SYN combination is stripped. The SYN comparison occurs only with the character received after the DLE character. If two successive DLE characters are received, only the first DLE character is stripped. No parity check is made in this mode.

TRANSMITTER OPERATIONS: Information is transferred to the THR (Transmitter Holding Register) by a Write operation. Information can be loaded into this THR at any time, even when the Transmitter is not enabled. Transmission of data is initiated only when the Request-to-Send Bit is set to a logic "one" in the USART control register and the Clear-to-Send input is at a logic "low". Information is normally transferred from a THR to the Transmitter Register when the latter has completed transmission of a character. However, information in the DLE register may be transferred prior to the information contained in the THR if the Force-DLE signal condition is enabled (CR15=Force, DLE and CR16=TX Transparent and set to a logic "one"). The control bit CR15 must be "set" prior to loading of a new character in the THR to insure forcing the DLE character prior to transmission of the data character. The Transmitter Register output passes through a Flip-Flop which delays the output by one clock period. When using the 1X clock generated by the modem Data Set, the output data changes state on the negative clock transition and the delay is one bit period.

When the Transmitter is enabled, a Transmitter "interrupt" is generated each time the THR is empty. If the THR is empty when the Transmitter Register is ready for a new character, the Transmitter enters an "idle" state. During this idle time, a logic "high" will be presented to the Transmitted Data Output in the Asynchronous Mode or the contents of the SYN register will be presented in the Synchronous Non-Transparent Mode (CR16=0). In the Synchronous Transmit Transparent Mode (enabled by bit-6 of USART control register 1=Logic 1), the idle state will be filled by a DLE-SYN character transmission in that order. When entering the Transparent Mode, the DLE-SYN fill-in will not occur until the first forced DLE.

If the Transmitter section is disabled by a reset of the Request-to-Send signal (RTS), any partially transmitted character is completed before the Transmitter section of the USART is disabled. As soon as the CTS signal (Clear-to-Send) goes high, the transmitted data output will go high.

When the Transmit Parity is enabled, the selected Odd or Even parity bit is inserted into the last bit of the character in place of the last bit of the Transmitter Register. This limits transfer of character information to a maximum of 7-bits plus parity or 8-bits without parity. Parity cannot be enabled in the Synchronous Transparency Mode.

INPUT/OUTPUT OPERATION OF USART: All Data, Control and Status words are transferred over the Data Access Lines (DAL0-7) as seen in FIG. 2, DAL. Additional input lines provide controls for addressing a particular unit and regulating all input and output operations. Other lines provide interrupt capability to indicate to a controller that an input operation is requested by the USART. All input/output terminology is referenced to the Bus Controller-Transceiver 503, FIG. 2, so that a "Read" or Input takes data from the USART and places it on the DAL lines to the Transceiver 503, while a "Write" or an Output places data from the Transceiver 503 onto the DAL lines and into the USART. The following input/output terminology discussed below is referenced to the Bus Controller-Transceiver 503.

(i) READ: A Read operation is initiated by the placement of an 8-bit address from State Machine 600 on the DAL by the Bus Controller 503, FIG. 2. When the Chip Select signal goes to a logic "low" state, the USART (as 508) compares bits 7-3 of the DAL with its hard-wired ID code (on USART Pins 17, 22, 24, 25, 26) and becomes selected on a "Match" condition. Bits 2-0 of the address are used to select the USART registers to "read from" as follows:

TABLE Y-3

| Bits 2-0 | Selected Register of USART |
|----------|----------------------------|
| 000      | Control Register 1         |
| 010      | Control Register 2         |
| 100      | Status Register            |
| 110      | Receiver Holding Register  |

When the Read Enable (RE) input line of the USART is set to a logic "low" condition by the State Machine 600, the USART gates the contents of the addressed register onto the DAL bus. The Read operation terminates, and the devices become unselected, and both the Chip Select and Read Enable return to the logic "high" condition. Reading of the Receiver Holding Register clears the DR Data Received status bit. Bit zero must be a logic "low" in Read or in Write operations.

(ii) WRITE: A Write operation is initiated by making a Chip Select input go to the logic "low" state. Bits 2-0 of the address are used to select USART registers which are written into as follows:

TABLE Y-4

| Bits 2-0 | Selected Register of USART   |
|----------|------------------------------|
| 000      | Control Register 1           |
| 010      | Control Register 2           |
| 100      | SYN and DLE Register         |
| 110      | Transmitter Holding Register |

When the Write Enable (WE) line is set to a logic "low" condition by the State Machine, the USART gates the data from Transceiver 503 onto the DAL bus and into the addressed register. If data is written into the Transmitter Holding Register (THR), the THRE (THR empty) Status Bit is cleared to a logic zero. The "100" address loads both the SYN and DLE registers. After writing into the SYN register, the device is conditioned to write into the DLE register if followed by another Write pulse which has the "100" address. Any intervening Read or Write operation with another address resets this condition such that the next "100" will address the SYN register.

(iii) INTERRUPTS: The following conditions will generate interrupts:

1. Data Received (DR)—indicates transfer of a new character to the Receiver Holding Register (RHR) while the Receiver is enabled.

2. Transmitter Holding Register Empty (THRE-)—indicates that the THR register is empty while the Transmitter is enabled. The first interrupt occurs when the Transmitter becomes enabled if there is an "empty" THR, or after the character is transferred to the Transmitter Register, thus making the THR empty.

3. Carrier On—this indicates the Carrier Detector input has gone "low" when DTR is "on". (DTR=Data Terminal Ready).

4. Carrier Off—indicates that the Carrier Detector input has gone "high" when DTR is "on".

5. DSR On—indicates the Data Set Ready input has gone "low" when DTR is "on".

6. DSR Off—indicates the Data Set Ready input has gone "high" when DTR is "on".

7. Ring On—indicates the Ring Indicator input has gone "low" when DTR is off.

Each time an Interrupt Condition exists, the INTR output from the USART is made a logic "low". The State Machine then acknowledges the Interrupt Request by setting the CS (Chip Select) and Interrupt Acknowledge Input (IACK) to the USART to a "low" state, otherwise the Interrupt Condition (INTR) would never get reset.

Auto Call Operation: (For Operations Using an 801 Auto Call Unit)

The 801 ACU has a 4-bit interface for receiving digits of the call number to be dialed. This interface is defined by the EIA Standard RS-366 and involves the following signals:

TABLE Y-5

| Call Request | CRQ |
|---|---|
| Data Line Occupied | DLO |
| Present Next Digit | PND |
| Digit Present | DPR |
| Data Set Status | DSS |
| Abandon Call and Retry | ACR |
| NB 8 Digit | |
| NB 4 Digit | |
| NB 2 Digit | |
| NB 1 Digit | |

The dialing sequence operates as follows:

The Line Adapter turns CRQ "on" provided that the DLO is "off". After detection of the dial tone, which is done by the 801, the digits are transferred one at a time to the 801. The 801 converts the digits to signals which duplicate the function of a rotating dial-pulse or a touch-tone frequency compatible signal. These signals are transmitted to the phone line. At call completion, DSS comes "on" to signify receipt of answer tone from the called Data Set. Receipt of DSS allows the line to be transferred to the ACU associated data set. If DSS fails to come "on", the Abandon Call and Retry (ACR) timer begins timing out.

With pulse dialing, a typical 10 digit number takes 15 seconds to dial; for touch-tone dialing the same number requires approximately one second. The answer sequence begins sometime after the last digit has been sent by the 801.

Interface Operation (Data-Comm Line-Adapter/State Machine)

The UIO Data-Communication Line-Adapter is an application dependent device which is controlled by the UIO State Machine Processor 600. The basic types of Line Adapters are available—these are the "Character Oriented" Line Adapter and the "Bit Oriented" Line Adapter, each of which may have a variety of electrical interfaces to the data communication lines.

One to eight Line Adapters may be serviced by one State Machine Processor on an individual basis. Each Line Adapter contains components which are addressable and are serviced by the State Machine Processor with PUT or GET instructions. The components on the Line Adapter are serviced with one or a series of instructions which, in some cases, provide sequential control of the component. The "communication" between the State Machine Processor and the Line Adapter can be separated into two basic groups:

(i) Undesignated
(ii) Designated

The "Undesignated" operations do not require the Line Adapter to be designated to execute those instructions. "Designated" type operations require the Line Adapter to be designated or "identified" to execute those instructions or series of instructions.

The following operations (except for ACUOR) in addition to requiring the Line Adapter to be "Designated" will use the First Control Register 37 in the State Machine Processor 600 for control purposes to components on a Line Adapter. With the exception of the Clear OP, all other operations will be a series of PUT/-GET OPs to provide the necessary sequential control.

"Data" outputted to the Line Adapter for these operations will originate from the Second Output Control Register 38 of the State Machine in FIG. 3.

The bits of the First Output Control Register 37 of the State Machine (FIG. 3) are organized for control functions as follows:

TABLE Y-6

(Output Control Register Bits for First Control Register 37, FIG. 3)

| Bit | Signal | |
|---|---|---|
| 0 | UCS | USART Chip Select - This bit must be a "1" when the USART requires a chip select. |
| 1 | TCS | Timer Chip Select - This bit must be a "1" when the Program Timer/Baud Rate Generator requires a chip select. |
| 2 | IACKI | Interrupt Acknowledge In - This bit must be a "0" to acknowledge an interrupt from a designated and chip selected USART. |
| 3 | WE | Write Enable - This bit must be "0" to enable writing to the USART or Timer. |
| 4 | RE | Read Enable - This bit must be "0" to enable reading from the USART or Timer. |
| 5,6 | A0,A1 | Address Bit 0 or 1 - These two bits select a register within the Timer. |
| 7 | CLR | Clear - This bit must be "1" to provide a clear to the Line Adapter. |

USART Interfacing: Three procedures are used when communicating with a USART on a Line Adapter; these are:

(i) Interrupt Acknowledge Procedure
(ii) Read Procedure
(iii) Write Procedure

Timer/Baud Rate Generator Interfacing

Two basic prodedures are used when communicating with the timer components; these are: (i) Write Procedure and (ii) Read Procedure.

Five control signals originating from unique bits of the First Output Control Register 37 are used for the Timer. These are:

TCS—Timer Chip Select
A0, A1—Register Addressing Lines
WE—Write Enable
RE—Read Enable Baud Rate Generator: The "character" oriented UIO Data Comm Line Adapters will use a USART which requires an input clock that is 32 times faster than the bit-time of the Asynchronous line it is communicating with. To obtain this X32 clock it is preferred to use an Intel 8253 programmable timer chip, whose squarewave output is connected to the USART. This timer is driven by a crystal controlled clock whose frequency is 1.2288 megahertz. After initializing the Timer, a divisor value must be loaded which will produce the necessary X32 clock.

Figure 7A:
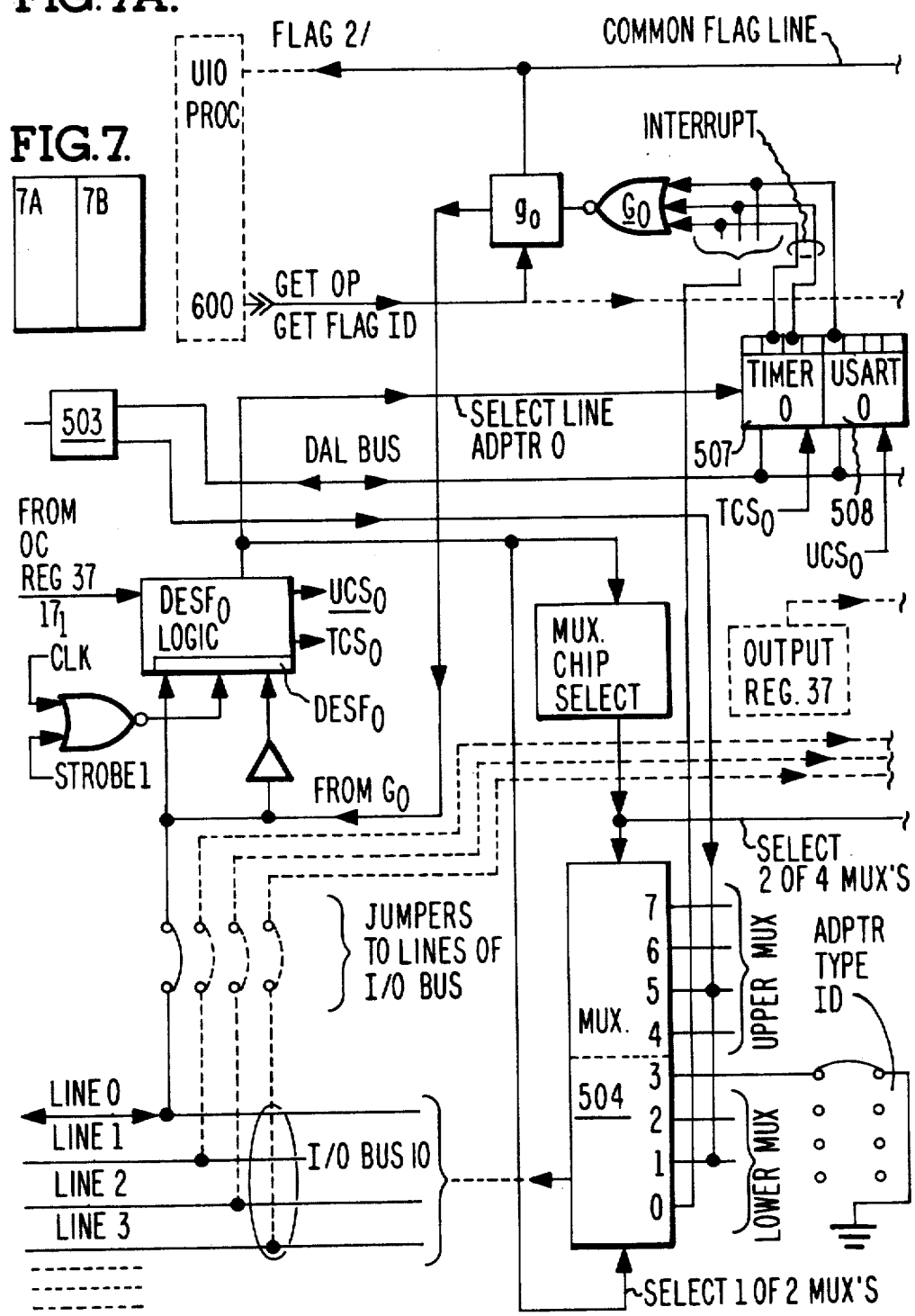
FIG. 7 is a schematic drawing of an expanded version of FIG. 2 which indicates a more detailed view of the multiple line adapter organization.
Figure 7B:
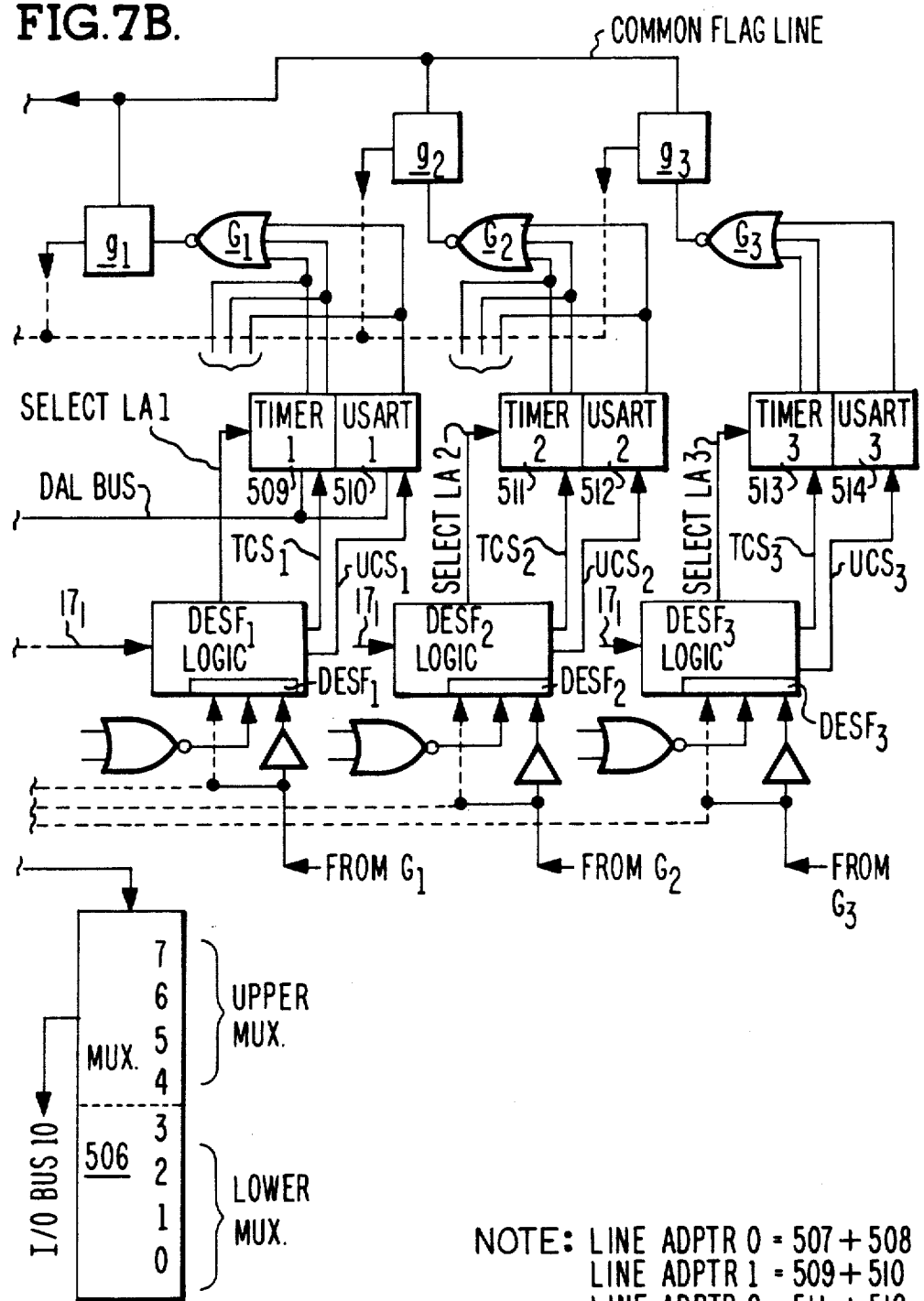

Referring to FIG. 7 there is shown a schematic representation of the multiple line adapter organization which indicates how the basic operating circuitry is repeated for each individual line adapter. Each line adapter is numerically designated as line adapter 0, line adapter 1, line adapter 2 and line adapter 3 and corelates to the abbreviated schematic of FIG. 2.

Figure 12:
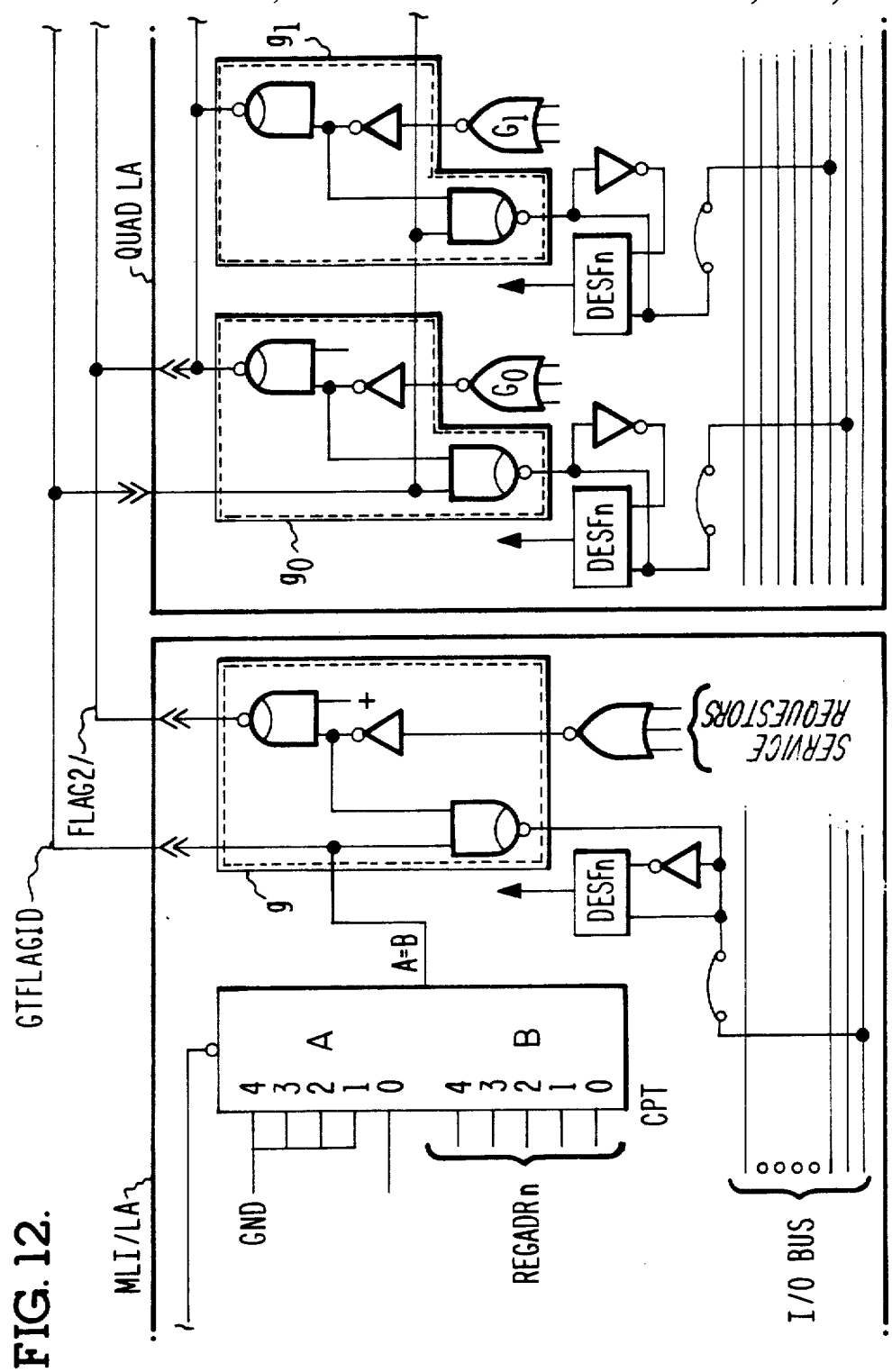
FIG. 12 is a schematic drawing showing the connections for the routing means $g_0$, $g_1$, $g_2$, $g_3$ of FIG. 7.

In FIG. 7 it will be seen that each line adapter has one interrupt line from its USART and two interrupt lines from its timer means (which includes program timer 1 and program timer 2). These interrupt lines respectively connect to a set of gating means for each line adapter which are designated as $G_0$, $G_1$, $G_2$ and $G_3$. The output signal line of each of these gates $G_n$ will individually have routing means shown as $g_0$, $g_1$, $g_2$ and $g_3$. These routing means are shown in more detail in FIG. 12 which shows a typical routing means such as $g_0$ and $g_1$ which are essentially duplicates of each other except that they connect to different gating means.

Figure 10:
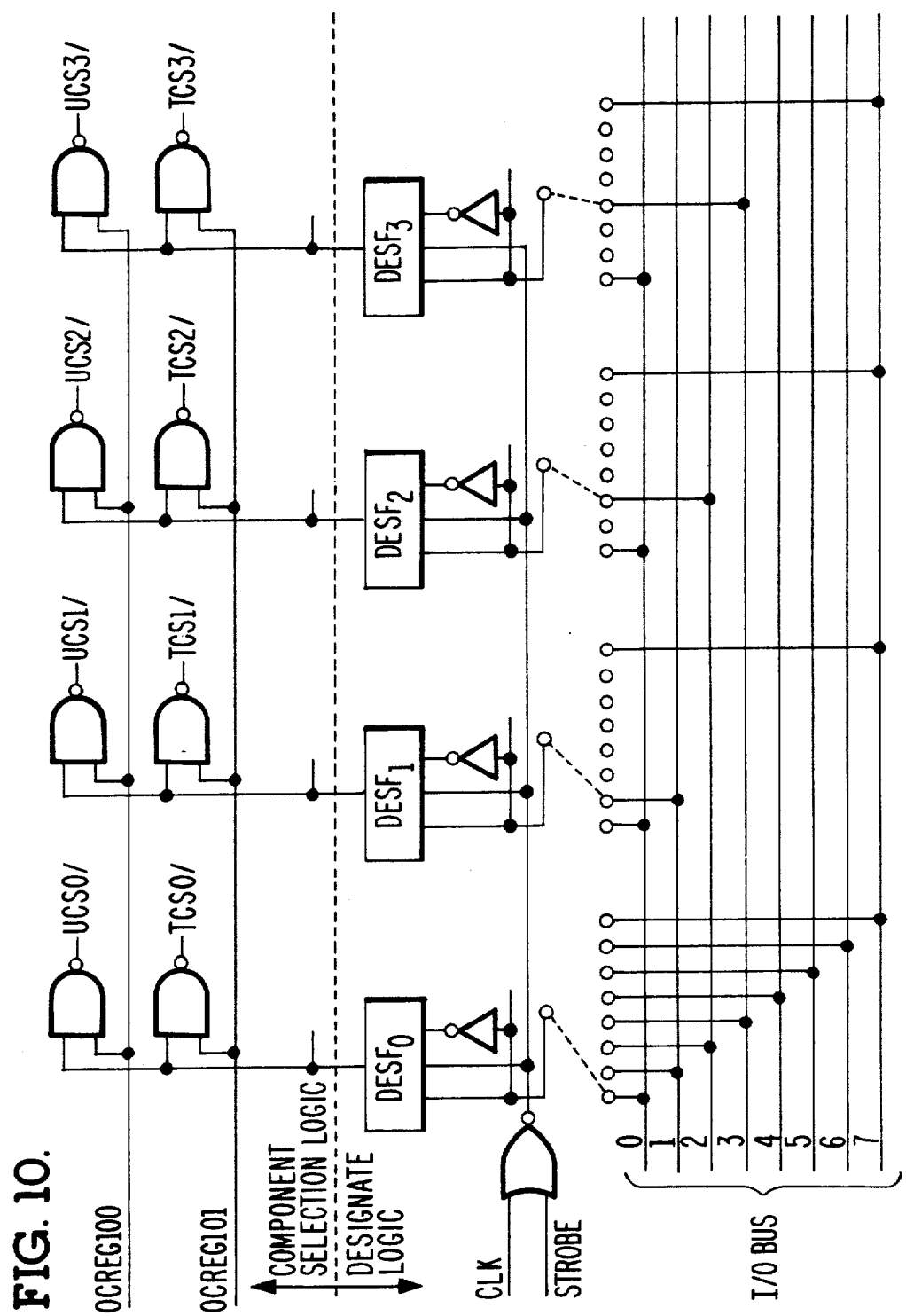
FIG. 10 is a schematic drawing showing the designate logic and component selection logic of FIG. 7.

As seen in FIG. 7 each line adapter will have its own designation logic means and its own component selection means which are shown in more detail in FIG. 10. Here it is seen that a series of flip-flops (DESF$_n$) connect to separate groups of component selection logic which is dedicated to each of the line adapters. Thus, in FIG. 10, signals from the first control register of the microprocessor 600 (of FIG. 3) can select either a USART chip select line or else the timer chip select line. However, this will only be operable if a selected or designated flip-flop of a particular line adapter has been activated in order to select the component of that particular line adapter. FIG. 10 also shows how the clock and strobe signals from the microprocessor 600 provide an input to each of the designate flip-flops and also how each of the designate flip-flops has a different connection line to a different bus-bit of the I/O bus 10.

Figure 8:
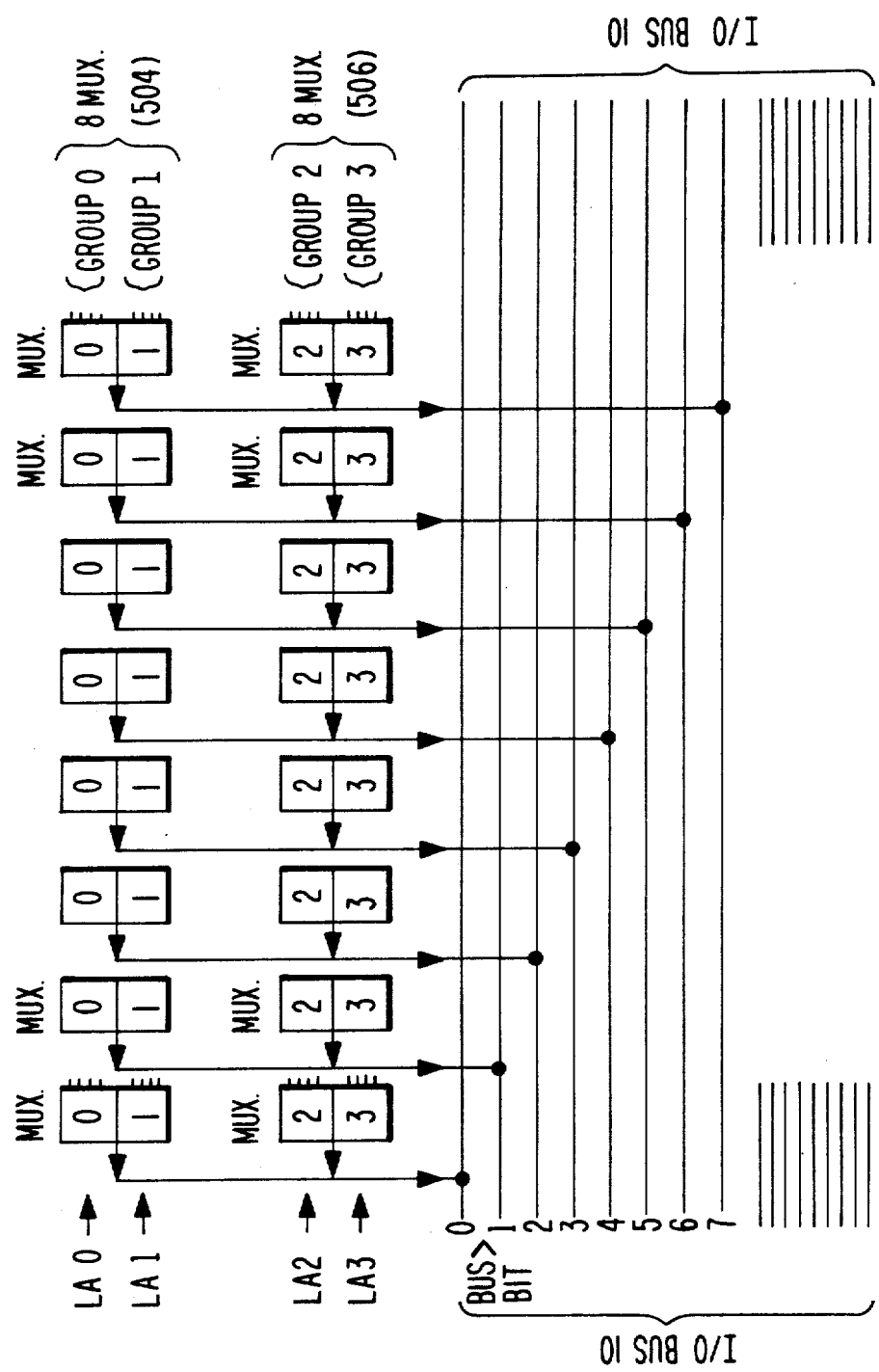
FIG. 8 is a schematic drawing showing the use of four "groups" of multiplexors where each "group" services eight bit-lines which connect to the I/O bus.

FIG. 8 is a schematic drawing showing how the multiplexors are set up in groups of eight so that each line adapter has available to it a group of eight multiplexors which are able to handle eight specific bit lines which connect to the I/O bus 10. Thus, a full byte or eight bits of data can be parallel-transferred from a designated line adapter through a particular group of multiplexors in order to transfer data to the I/O bus 10.

Figure 9:
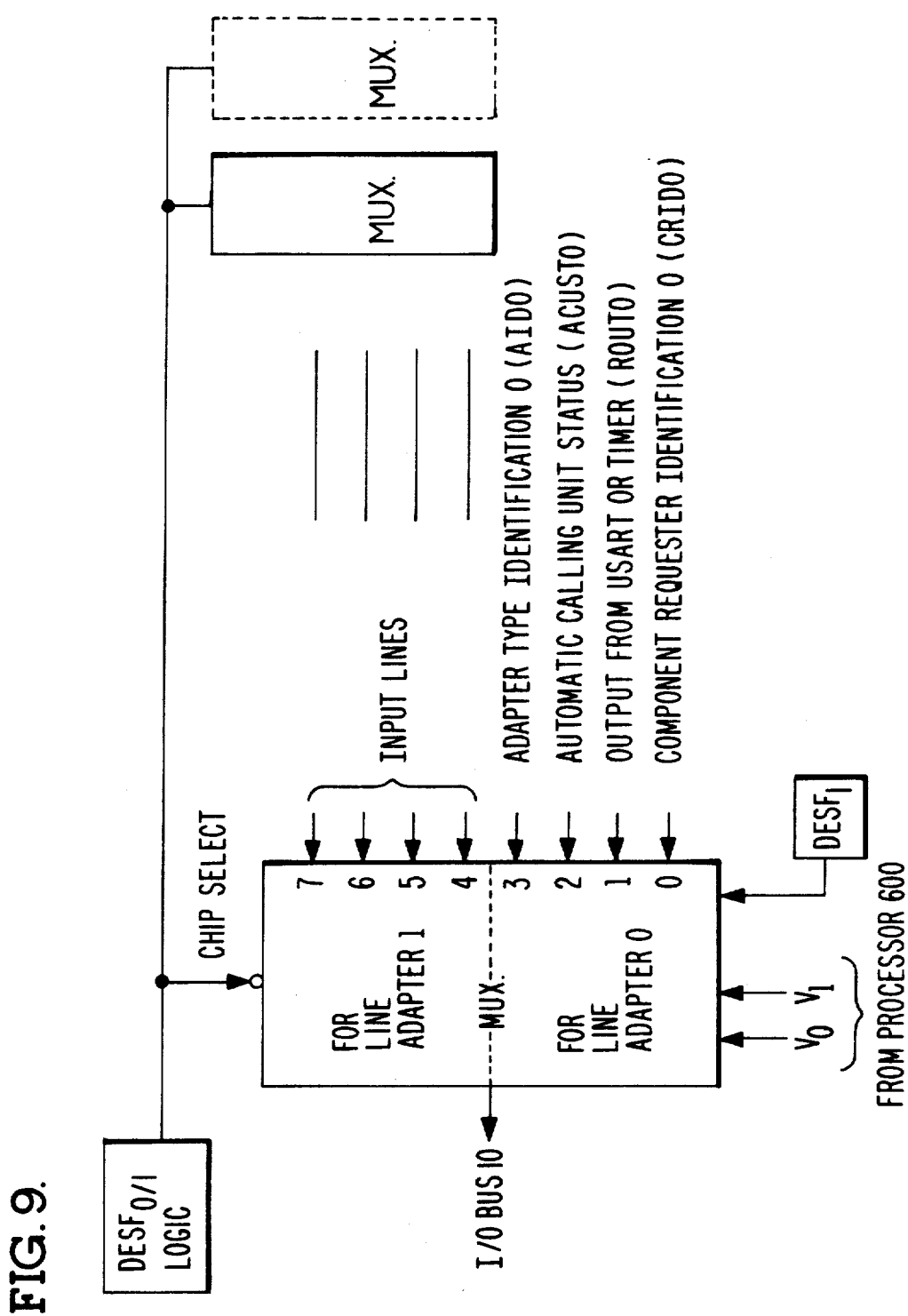
FIG. 9 is a sketch showing how a given multiplexor chip is selected in order to further select the upper multiplexor or lower multiplexor of each group.

FIG. 9 is a schematic drawing showing how the designate flip-flops can be activated in order to select a particular "group" of multiplexors by means of a chip select signal. Thus, the designate flip-flop logic (of FIG. 10) can be used to select a particular "group" of eight multiplexors after which another designate flip-flop such as DESF$_1$ of FIG. 9 can be activated to select either the upper (for line adapter 1 in this case) or the lower (for line adapter 0 in this case) multiplexor for operative use in any given cycle.

In FIG. 9 the instruction signals designated $V_0$ and $V_1$ are instruction data from the microprocessor 600 which will cause the selection of one input line from among the four input lines shown coming into a multiplexor. Thus, the output from either a USART or a timer of line adapter 0, which connects to the input pin number 1, can be selected as a signal which will be conveyed on the MUX output line over to the I/O bus 10.

As indicated in FIGS. 2, 3, 4 and 6, there is an output control register 1, designated as element 37 in these figures, which can provide control data to the component selection logic shown in the upper portion of FIG. 10. There are eight bits available for output from the output register 37 and bit four is used to provide a read enable signal E)/ . This $\overline{RE}$ signal is connected to the bus driver 503 and also to each of the USARTs and timers in each of the line adapters. It may be noted in FIGS. 2 and 4 that the transceiver bus driver 503 also has a data input line designated DIN 17$_2$ which is used to carry data to the line adapters. This data is received from the microprocessor 600 by means of the second output register 38.

There is an important distinction between those items and components which can "request service" and the particular items which can be "read from".

(a) Items requesting service: the components that can actually request service from the microprocessor 600 are: each of the USARTs in each of the line adapters, and each of the program timers in each line adapter (program timer 1, PT1, and program timer 2, PT2).

(b) Elements capable of being read from: there are six elements or items which can be "read from". These are the previously mentioned USARTs and program timers in addition to the following:

CRID—component requestor identifier;
ACUST—automatic calling unit status;
ADID—adapter identification signal done via settable jumpers.

The microprocessor 600, which was designated as a universal input output state machine and described in the previously cited patents included by reference, uses what is called a PUT operator in order to place data into a designated location and also has another operator called the GET operator which is used to retrieve and get data from a particular location. These PUT and GET operators provide many types of functions in the system, but basically provide the functions of either putting out data or getting data in various contexts of use in the system. The use of these PUT and GET operators has been described in the previous recited reference patents.

Figure 11:
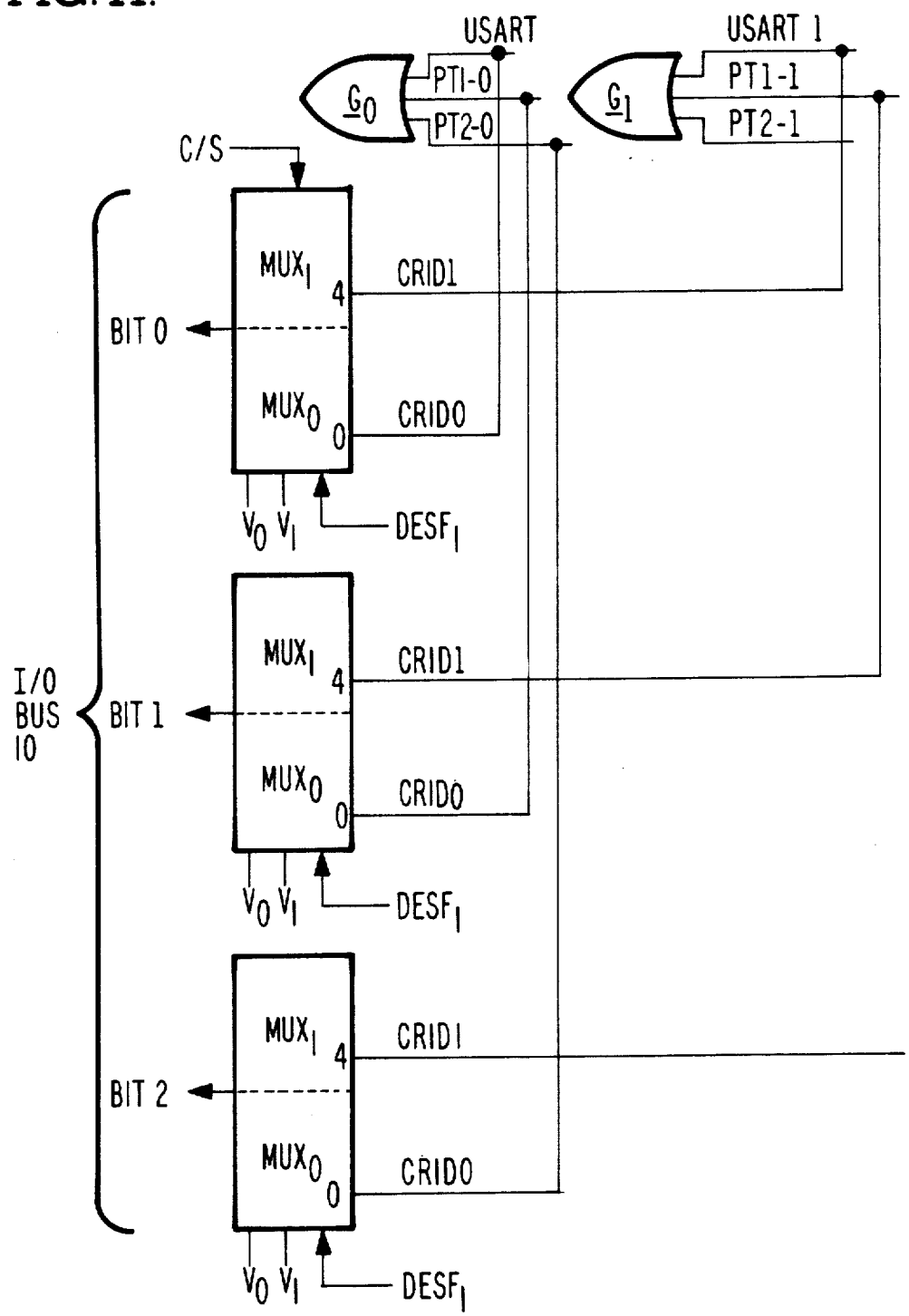
FIG. 11 is a drawing showing how the USARTs and Timers of different line adapters connect to the lower and upper multiplexor groups.

Referring to FIG. 11, there is a schematic drawing showing how the interrupt request line from either a USART or the first program timer PT1 or the second program timer PT2 from each of the line adapters is connected to selected multiplexors in order that the interrupt signal may be carried over to specified bit lines of the I/O bus 10. For example, in FIG. 2 and in reference to multiplexor 504, it will be seen that the input pins number 0 and number 4 respectively receive component requestor identification lines from line adapter 0 and line adapter 1. Thus, three of the multiplexors, seen in FIG. 11, of a group of eight multiplexors can be used to determine which particular component (the USART or the first or second timer) is requesting service since three separate multiplexors of a group of eight multiplexors can thus separate these requesting signals and can activate a different bit line of the I/O bus 10.

In the particular system using the microprocessor 600, the GET OPs will "read out" the I/O bus 10. Thus, the microprocessor 600 when reading out the I/O bus 10 can sense which particular bit line has been activated and thus will indicate an identification of which component is doing the requesting, that is to say whether it is the USART or the first or second program timer of a particular line adapter. In each case the operative multiplexor whether it is the lower multiplexor or the upper multiplexor will have been selected by a designate flip-flop signal.

It is useful to point out that the I/O bus 10 has a "multiple usage" capability, that is it is used for data transmission to and from the state machine processor 600, but is also useful in setting the "designate flip-flop" $DESF_n$ and also for getting signal data from the gates ($G_0$, $G_1$, $G_2$, $G_3$) in order to locate which line adapter is requesting service attention, and then further the I/O bus also serves the function of reading out the bus bits 0, 1 and 2 in order to determine which particular component of a designated line adapter is requesting service.

As seen in FIG. 7 and FIG. 10, a strobe signal (strobe 1) from the microprocessor 600 is conveyed to all of the designate flip-flops. Now, one of the designate flip-flops will get a further input according to a previously connected jumper wire to an I/O bus line $bit_n$. This prejumped wire also serves as connection from the gating means ($G_0$–$G_3$) to the I/O bus line $bit_n$. The microprocessor 600, by using a GET OP, will obtain information from the I/O bus to determine which Line Adapter(s) is requesting service (designated Line Adapter). Subsequently the microprocessor can now address the particular line adapter designated and by selecting the appropriate input signal line of the multiplexor (FIG. 11), then find which particular component of the given line adapter is requesting service, after which it can use its read routine to read out the data from the selected component.

Summary of Overall Read Operations Control (1) Assume an empty buffer in USART 0 which "needs" another byte of data for transmission by its transmitter. The USART 0 initiates an interrupt signal which activates the signal (FLAG 2/).

(2) The microprocessor executes the GET FLAG ID—This allows the microprocessor to identify which line adapter or line adapters are requesting an interrupt. The routing logic ($g_0$) permits the output of the gate $G_0$ to activate bit "0" of the I/O bus 10.

(3) Simultaneously the microprocessor reads the I/O bus bit line and finds that bit 0 (for example) is "active".

(4) The microprocessor sets bit 0 and executes a PUT OP with the signal strobe 1 in order to set the designate flip-flop $DESF_0$. Thus, the designate flip-flop $DESF_n$ is set.

(5) Now the microprocessor 600 wants to know "which component" of the "designated" line adapter is requesting service. The microprocessor executes a GET OP in order to read the component requestor ID identifier (CRID).

(6) Referring to FIG. 11, the V field of the GET OP (V=11100) selects the "0" or "4" input to the MUXs (FIG. 9) (depending on whether there was a selection of the upper MUXs or the lower MUXs which is controlled by the $DESF_n$).

(7) Bit 0 of I/O bus 10 receives the output of the MUX and is now active (for USART); the microprocessor 600 will now "read" this data.

(8) Now that the microprocessor knows or has been informed that the USART (of the designated line adapter) needs service, it must first acknowledge the interrupt, and it uses a USART interrupt acknowledge procedure which turns off the original interrupt signal.

(9) The microprocessor 600 will now read, for example, the USART status register in order to determine "what it was" which caused the interrupt, for example, that the transmit register buffer is empty and needs data.

(10) The microprocessor will then execute the "USART read procedure" by loading the status register address in the microprocessor's second output register 38.

(11) Register 38 data is sent through the bus driver 503 to the data access lines bus (DAL) and is conveyed to the USART.

(12) The USART chip select (UCS of FIG. 10) is made "active" via a PUT OP via the first output control register 37 (of FIG. 3) and the "designated" flip-flop being set.

(13) Next the PUT OP will also enable the "read enable" E)/ to the bus driver 503 and to the USART$_0$ in order to allow data from the USART to travel on the DAL bus through bus driver 503 over to the output line designated ROUT, shown in FIG. 2 and FIG. 4. The data out (DOUT) lines (also called DAL) are now connected to the ROUT lines (Read-out).

(14) Then the ROUT line is connected through the MUX 504 to the I/O bus 10. This is done by using the input terminal 1 (or 5) of MUX 504 (V=xxx01), depending on upper or lower MUX selection.

(15) The status register data is connected onto the I/O bus for the microprocessor to examine the data in order to formulate the next instruction.

(16) The microprocessor will now turn "off" the read enable E)/ and the USART chip select (UCS).

(17) The microprocessor 600 will then go to the next appropriate procedure depending on what was found on the I/O bus.

In this particular example, the microprocessor will want to "send" data (write) to the USART, for transmission to the data communications line to continue the transfer of data to a remote terminal.

Thus, the microprocessor 600 can interrogate (READ) the component requesting register in the USART, in the program timer 1 and program timer 2. All of these can be individually addressed and "read" out.

Other Functions: The microprocessor can interrogate the adapter type ID which connects a set of jumpers which can inform of the "type" of adapter and type of protocol requirements it has. The microprocessor can also interrogate data in the automatic calling status register.

Read and Write Systems Procedures for USART

Regarding paragraphs (i) Read and (ii) Write just discussed above, the USART Read procedure is used when reading the USART data registers, status registers or control registers discussed previously under the top of "USART Organization and Operation".

Thus, in the (i) Read procedure, the following series of operations occur:

|      | OP  | V-FLD | D-FLD | DATA (Hex Code) |
|------|-----|-------|-------|-----------------|
| (ia) | PUT | 01110 | X001  | kk              |

Here, the second output control register 38 of the State Machine Processor 600 (FIG. 3) is strobed by Strobe #2 signal to load it with the register-address of the USART. Also kk=the address of the USART register to be read as per Table Y-7, shown hereinafter below.

|      | OP  | V-FLD | D-FLD | DATA |
|------|-----|-------|-------|------|
| (ib) | PUT | 01101 | X001  | ID   |

Here, the first control register 37 (FIG. 3) is strobed by Strobe #2 to signal a USART Chip Select (pointer to selected USART).

|      | OP  | V-FLD | D-FLD | DATA |
|------|-----|-------|-------|------|
| (ic) | PUT | 01101 | X001  | OD   |

Here, upon the occurrence of Strobe #2, the first output control register 37 will initiate the RE (read enable) signal.

|      | OP  | V-FLD | D-FLD | DATA |
|------|-----|-------|-------|------|
| (id) | GET | 11101 | —     | FFnn |

(where nn indicates the lower 8 bits of I/O bus 10 and where FF represents the "upper" 8 bits of I/O bus 10 which are not significant for control purposes). This OP gets the data read out from the selected register and onto the I/O bus 10, FIG. 2 (via the Data Access Line, DAL, bus-controller 503 and MUX 504), and where nn=the data (read-out) on the least significant 8-bits of the I/O bus 10.

|      | OP  | V-FLD | D-FLD | DATA |
|------|-----|-------|-------|------|
| (ie) | PUT | 01101 | X001  | IC   |

This OP takes the control signal from the first register 37, during Strobe #2, in order to remove (disconnect) the chip select of the USART just read.

*The address (kk) of the various USART registers to be "read" is shown in Table Y-7 below.

TABLE Y-7

| Address    | USART Register           |
|------------|--------------------------|
| 06 (=110)  | Receive Holding Register |
| 04 (=100)  | Status Register          |
| 02 (=010)  | USART Control Register #2|
| 00 (=000)  | USART Control Register #1|

Now, when it is required to "write" into a designated register of a selected USART, the following (ii) WRITE procedure is used:

|        | OP  | V-FLD | D-FLD | Data (Hex code) |
|--------|-----|-------|-------|-----------------|
| (ii-a) | PUT | 01110 | X001  | k'k'            |

Here, when Strobe #2 strobes the second output control register 38 (FIG. 3), then the USART register address k'k' will be loaded with the USART address. Here, k'k'=the address of the USART register to be written into as per Table Y-8.

|        | OP  | V-FLD | D-FLD | Data |
|--------|-----|-------|-------|------|
| (ii-b) | PUT | 01101 | X001  | ID   |

Here, Strobe #2 will strobe the first output control register 37 (FIG. 3) to chip select the desired USART.

|        | OP  | V-FLD | D-FLD | Data |
|--------|-----|-------|-------|------|
| (ii-c) | PUT | 01110 | X001  | nn   |

Here, Strobe #2 will strobe data into the second output control register 38 (FIG. 3) which data (WRITE DATA) is later destined for the addressed register of the selected USART.

|        | OP  | V-FLD | D-FLD | Data |
|--------|-----|-------|-------|------|
| (ii-d) | PUT | 01101 | X001  | 15   |

Here, when Strobe #2 occurs, then the first output control register 37 (FIG. 3) provides a Write Enable E)/ signal to the selected USART so that data from 2nd OC register 38 will be written into the addressed register of the selected USART.

|        | OP  | V-FLD | D-FLD | Data (Hex code) |
|--------|-----|-------|-------|-----------------|
| (ii-e) | PUT | 01101 | X001  | IC              |

Here, upon occurence of Strobe #2, then first OC register 37 will continue the Write Data cycle for one extra clock for data to be written into the addressed register, after Chip Select and Write Enable are turned off.

The address k'k' of the USART registers to be "written into" are shown in Table Y-8 below:

TABLE Y-8

| Address | USART Register to be written into |
|---------|-----------------------------------|
| 06      | Transmit Holding Register         |
| 04      | SYN/DLE Register                  |
| 02      | Control Register #2               |
| 00      | Control Register #1               |

USART Interfacing: Three procedures are used when communicating with a USART on a Line Adapter; these are:
 (i) Read Procedure
 (ii) Write Procedure
 (iii) Interrupt Acknowledge Procedure Timer/Baud Rate Generator Interfacing:

Two basic procedures are used when communicating with the timer components; these are: (i) Write Procedure and (ii) Read Procedure.

Five control signals originating from unique bits of the First Output Control Register 37 are used for the Timer. These are:
 TCS—Timer Chip Select
 A0, A1—Register Addressing Lines WE—Write Enable
RE—Read Enable Baud Rate Generator: The "character" oriented UIO Data Comm Line Adapters will use a USART which requires an input clock that is 32 times faster than the bit-time of the Asynchronous line it is communicating with. To obtain this X32 clock it is preferred to use an Intel 8253 programmable timer chip, whose square-wave output is connected to the USART. This timer is driven by a crystal controlled clock whose frequency is 1.2288 megahertz. After initializing the Timer, a divisor value must be loaded which will produce the necessary X32 clock.

Read-Write: Selected Timer-Registers

In order to "write" into any of the timer registers (residing in 507, 509, 511, 514 of FIG. 2) a timer-write procedure (tw) is used as follows, where:
- k=1 is the Program Timer #1 address
- k=3 is the Program Timer #2 address
- k=5 is the Baud Rate Generator Data field address
- k=7 is the mode word address

|         | OP  | V-FLD | D-FLD | Data (Hex Code) |
|---------|-----|-------|-------|-----------------|
| (tw-1)  | PUT | 01101 | X001  | kE              |

Here, the PUT OP will put selection and mode data in the first output control register 37 (FIG. 3) which will chip select the desired timer register ($A_0A_1$) per value of "k".

|         | OP  | V-FLD | D-FLD | Data (Hex Code) |
|---------|-----|-------|-------|-----------------|
| (tw-2)  | PUT | 01101 | X001  | k6              |

Here, the PUT OP (an occurrence of Strobe #2) will turn on the "Write Enable" lines for permitting data transfer to the selected register of the selected timer.

|         | OP  | V-FLD | D-FLD | Data (Hex Code) |
|---------|-----|-------|-------|-----------------|
| (tw-3)  | PUT | 0110  | X001  | nn              |

Here, the PUT OP (on occurrence of Strobe #2) will transfer data residing in Second Output Control Register 38 (FIG. 3) to the selected register of the selected timer.

|         | OP  | V-FLD | D-FLD | Data (Hex Code) |
|---------|-----|-------|-------|-----------------|
| (tw-4)  | PUT | 01110 | X001  | $\overline{nn}$ |

Here, Strobe #2 enables Second Output Control Register 38 (FIG. 3) to write (transfer) data as in (tw-3), thus permitting two clock periods for "write".

|         | OP  | V-FLD | D-FLD | Data (Hex Code) |
|---------|-----|-------|-------|-----------------|
| (tw-5)  | PUT | 01101 | X001  | kE              |

Here, on Strobe #2, the PUT OP will select the First Output-Control Register 37, and turn off $\overline{WE}$.

|         | OP  | V-FLD | D-FLD | Data (Hex Code) |
|---------|-----|-------|-------|-----------------|
| (tw-6)  | PUT | 01101 | X001  | 1C              |

Here, on Strobe #2 the PUT OP will take control data from First Register 37 (FIG. 3) to turn off the timer chip select, and turn off the address of the selected timer register.

When it is desired to "read" out data from either Program Timer #1 or #2, then the "Read-Procedure" for timer-read (tr) is used as follows, where:
- k=1 represents the Program Timer #1 data field address value
- k=3 represents Program Timer #2 data field address value
- (k−1)=0 represents Program Timer #1 data field address value and $\overline{RE}$ (read enable - on)
- k=2 represents Program Timer #2 data field address value and $\overline{RE}$ (read enable-on).

|         | OP  | V-FLD | D-FLD | Data (Hex Code) |
|---------|-----|-------|-------|-----------------|
| (tr-1)  | PUT | 01101 | X001  | kE              |

Here, on Strobe #2 the PUT OP will load First Register 37 with bits to address-select a timer-register ($A_0$, $A_1$ - bits 5, 6) and to Chip Select a Timer (bit 1 of Table Y-6).

|         | OP  | V-FLD | D-FLD | Data (Hex Code) |
|---------|-----|-------|-------|-----------------|
| (tr-2)  | PUT | 01101 | X001  | (k-1) · E       |

Here, First Register 37 (FIG. 3) is Read-Enabled so that data from Timer register can be read-out.

(tr-3)

Exactly the same as (tr-2). This gives extra time to place data from the selected timer-register onto the I/O bus 10.

|         | OP  | V-FLD | D-FLD | Data (Hex Code) |
|---------|-----|-------|-------|-----------------|
| (tr-4)  | GET | 11101 | —     | $\overline{nn}$ |

Here, the GET OP takes the read-out data (from the selected timer-register) which is on the I/O bus 10 (FIG. 2) and puts it into the State Machine microprocessor. The data is in "inverted" form (=$\overline{nn}$).

|         | OP  | V-FLD | D-FLD | Data (Hex Code) |
|---------|-----|-------|-------|-----------------|
| (tr-5)  | PUT | 01101 | X001  | kE              |

Here, the PUT OP (on Strobe #2) will turn-off the $\overline{RE}$ (read-enable) in the First Register 37.

|         | OP  | V-FLD | D-FLD | Data (Hex Code) |
|---------|-----|-------|-------|-----------------|
| (tr-6)  | PUT | 01101 | X001  | 1C              |

This PUT OP (on Strobe #2) will set bit 1 of First Register 37 to "0" to turn off the Timer Chip Select control signal, to remove the pointer.

The above described line adapter organization involves an architecture where one microprocessor can be used to handle up to eight separate line adapters and wherein each of the line adapters may have three components therein (USART and program timer 1, program timer 2). Each of these three components have a capability of "requesting" service which thus leads to the total capability of 24 separate units which are capable of requesting service from the microprocessor 600.

Additionally, there are several other components associated with each line adapter which may be interrogated by the processor and read out for use of the microprocessor in getting certain operating information. These are the adapter indentification, which is an encoded signal set by settable jumpers which identify the particular type of adapter involved and the type of protocol required, and also there is the automatic calling unit status signal data which can be interrogated in order to find out the state of a telephone line which is being used to transfer/receive data between a remote terminal and a line adapter. Thus, there are at least six items of data for each line adapter which can be read out by the microprocessor. These are: the USART, Program Timer 1, Program Timer 2, the ACU-Status, the Adapter ID, and Component Requestor ID (FIG. 9). Assuming a system using eight line adapters, this gives a total of 48 elements which can be read out and garnered for data to be supplied to the microprocessor 600.

There has been herein described a data communication system for use in communicating to remote terminals where a multiple line adapter organization is controlled by a single microprocessor and wherein the internal communications are handled through multiple groups of multiplexors which can be selected in order to allow the reading out of data for the microprocessor which can then formulate its subsequent instructions for service to particular line adapters and for enablement of data transmission and reception to and from remote terminals.

What is claimed is:

1. In a data-comm subsystem wherein a line support processor controls data transfer operations between a host computer and remote data terminals, and said line support processor includes a plurality of line adapters, a data link interface unit and a microprocessor, said microprocessor including program data in an internal PROM and in external RAM storage means and having an I/O bus and output control registers providing control data and information data to said line adapters, a Read-control system for communicating with said line adapters comprising:

(a) a plurality of line adapters, controlled by said microprocessor, and wherein each line adapter includes:
 (a1) USART control component means for transmission of or reception of data between a remote terminal and said microprocessor;
 (a2) timing means for setting baud rates of data transfers and for protocol timing signals;
 (a3) gating means for sensing when said USART means or said timing means requests service, said gating means providing an interrupt signal to said microprocessor;
 (a4) designate logic means for receiving control signals from said gating means and said microprocessor, for selecting a requesting USART means or timing means;

(b) driver-controller bus means for selecting either a data transfer path from said microprocessor to a selected USART means/timing means in a designated line adapter, or for selecting a data transfer path from a requesting USART means/timing means to a group of "n" multiplexors where n represents the number of bits in a byte of data whereby said group of "n" multiplexors provide a data path to said microprocessor via said I/O bus means;

(c) said microprocessor providing instruction signals to enable said gating means to activate a discrete bit line in said I/O bus, and including:
 (c1) means to scan said I/O bus to identify the requesting line adapter via said activated bit line;
 (c2) means to enable said driver-controller bus means to select a transfer path from a requesting USART/timing means to said group of multiplexors;
 (c3) means to select a designated input line for each multiplexor in said group of multiplexors;
 (c4) means to read out data from a requesting USART means/timing means;
 (c5) said I/O bus means connecting the outputs of said "n" multiplexors to said microprocessor;

(d) a plurality of groups of multiplexors connected to said driver-controller bus wherein each group of n multiplexors provides n bits of output data from said requesting USART/timing means for parallel transfer to said microprocessor on said I/O bus.

2. The read control system of claim 1 wherein each group of said multiplexors is connected to receive input signals from each line adapter which can be selected to convey data, to said microprocessor, as to the identity and protocol requirements of that line adapter.

3. In a data-comm subsystem wherein a line support processor controls data transfer operations between a host computer and remote data terminals, and said line support processor includes a plurality of line adapters, a data link interface unit and a microprocessor, said microprocessor including program data in an internal PROM and in external RAM storage means and having an I/O bus and output control registers providing control data and information data to said line adapters, a Read-control system for communicating with said line adapters comprising:

(a) a plurality of k line adapters, controlled by said microprocessor, and wherein each line adapter includes:
 (a1) programmable USART control component means for transmission of or reception of data between a remote terminal and said microprocessor, said USART means including a plurality of component control registers;
 (a2) programmable timing means for setting baud rate of data transfers and for protocol timing signals, said timing means including a plurality of timing control registers;
 (a3) gating means, connected to said USART control component means and said timing means, for signaling said microprocessor for service, and for activating a discrete bit line of said I/O bus;
 (a4) designate logic means, receiving control signals from said gating means and from said microprocessor, for selecting a particular line adapter and a particular register in said USART means or said timing means;

(b) said microprocessor operating to identify a component or timing register requiring service by scanning for an activated bit line of said I/O bus, and for reading out data from said selected register into said microprocessor in order to determine new instructions to be required, said microprocessor including:
 (b1) output select control signals connected to each of a plurality of multiplexors for selecting one of a plurality of input signals;

(c) bidirectional driver means, controlled by said microprocessor, for routing data from said microprocessor to a selected line adapter, or for routing data from a selected line adapter to one of a selected set of multiplexors to enable read out of data to said microprocessor from said selected line adapter;

(d) select-connection means for receiving a plurality of information signals and for connecting selected ones of said information signals to selected bit-lines of said I/O bus, said select-connection means including:

(d1) a plurality of k groups of multiplexors, each group of multiplexors having "n" multiplexors and each group connected to service a given line adapter such that the output of each one of said "n" multiplexors connects to a discrete bit line of said I/O bus and each multiplexor is connected to receive a plurality of input signals including information data signals from said given line adapter via said bidirectional driver means, where "n" represents the number of bit lines which can parallel-transfer a byte of data;

(d2) means to receive control signals from said microprocessor for selecting which one of said plurality of input signals to said multiplexers is to be connected to said I/O bus;

(e) I/O bus means connected to each of said plurality of groups of multiplexors and to said microprocessor such that each output line of each group of multiplexors has a discrete connection to a separate bit line of said I/O bus.

4. A read-control system for multiple line adapters in a data communications network, said read-control system comprising:

(a) microprocessor means including:
  (a1) a first output control register providing instructions to a component selection means in a designated line adapter;
  (a2) a second output control register providing bytes of data for transfer to a selected component in a designated line adapter;
  (a3) an I/O bus connecting output bit-lines of a plurality of groups of multiplexors to said microprocessor means;
  (a4) means to scan the bit-lines of said I/O bus for information as to which bit-lines are activated;
  (a5) means for selecting one group of a plurality of groups of multiplexors for connection to said I/O bus;

(b) a plurality of line adapters wherein each line adapter has USART and timing components, said components having addressable internal registers for providing information-data and for receiving instruction data, and wherein each of said line adapters includes:
  (b1) gating means connected to said USART and timing components for signaling a service request to said microprocessor means, said gating means including:
    (b1a) routing means, enabled by said microprocessor means, for activating a selected bit line in said I/O bus;
  (b2) designation logic means, activated by said microprocessor means, for enabling said component selection means of a particular line adapter requesting service;
  (b3) component selection means, activated by said first output control register, for selecting one of said USART or timing components in said line adapter requesting service;
  (b4) a plurality of group of multiplexors, wherein each group is associated with a line adapter, and is connected to receive instructions from said microprocessor means and wherein each of said multiplexors includes:
    (b4a) an input data line connected to receive data from its associated line adapter via a bus-driver controller means;
    (b4b) an input data line providing a coded signal to identify the type of line adapter being used;
    (b4c) an output data line connected to a discrete bit-line of said I/O bus;
    (b4d) and wherein each of said multiplexors is connected to receive instructions from said microprocessor to select which of said input data lines will be connected to said I/O bus;

(c) bus-driver controller means controlled by said microprocessor means to connect said first and second output control registers to a designated line adapter and/or to connect a designated line adapter to a selected group of multiplexors;

(d) means to read out data from a selected line adapter component for transfer to said microprocessor means.

* * * * *

UNITED STATES PATENT AND TRADEMARK OFFICE
CERTIFICATE OF CORRECTION

PATENT NO. : 4,598,360

DATED : July 1, 1986

INVENTOR(S) : Richard A. Loskorn

It is certified that error appears in the above-identified patent and that said Letters Patent is hereby corrected as shown below:

```
Col.  6, line 66, change "OCREG 20n)" to --(OCREG 20n)--.
Col.  9, line  8, change "(15:5equal" to --(15:5) equal--;
         line 12, change "condition,-" to --condition--;
         line 34, after "if" insert --MADDR (15:5) equal
                  01111 and the Designate Flip-Flop being--.
Col. 10, line 20, change "Orqanization" to --Organization--.
Col. 11, line 27, before "are" insert --there--;
         line 28, change "ister" to --isters--;
         line 50, change ""high?," to --"high"--.
Col. 12, line 45, change "1Receiver" to --1X Receiver--.
Col. 14, line 38, change "Data Received" to --(Data Received)--.
Col. 18, line 26, change "E)/." to --($\overline{RE}$).--.
Col. 19, line 38, change "jumped" to --jumpered--.
Col. 20, line 34, change "E)/" to --($\overline{RE}$)--;
         line 49, change "E)/" to --($\overline{RE}$)--.
Col. 22, line 32, change "E)/" to --($\overline{WE}$)--.
Col. 27, line 16, change "multiplexers" to --multiplexor--.
```

Signed and Sealed this

Twenty-first Day of October, 1986

[SEAL]

Attest:

DONALD J. QUIGG

*Attesting Officer*   *Commissioner of Patents and Trademarks*